United States Patent

Ohura et al.

[11] Patent Number: 5,805,218
[45] Date of Patent: Sep. 8, 1998

[54] METHOD FOR ADJUSTING A POSITION OF A SOLID-STATE IMAGE DETECTOR IN A GIVEN IMAGE-FORMING OPTICAL SYSTEM

[75] Inventors: Kouji Ohura, Yokohama; Keiji Shintani, Tokyo; Yoko Koseki, Yokosuka; Hiroto Toba, Yokohama; Toshiro Obi, Yokohama; Kazuyuki Kobayashi, Yokohama, all of Japan

[73] Assignee: Matsushita Electric Industrial Co., Ltd., Osaka, Japan

[21] Appl. No.: 614,496

[22] Filed: Mar. 13, 1996

[30] Foreign Application Priority Data

Jun. 20, 1995 [JP] Japan ................................. 7-152871
Oct. 16, 1995 [JP] Japan ................................. 7-266689

[51] Int. Cl.⁶ .................................................. H04N 5/232
[52] U.S. Cl. ........................................ 348/353; 348/188
[58] Field of Search .................................. 348/207, 218, 348/219, 345, 349, 350, 351, 352, 356, 187, 188, 180, 191; 358/406, 504, 474, 479, 494; 382/255, 286, 141, 151, 154; 250/201.7, 201.8; 356/400; 73/1.79, 1.81

[56] References Cited

U.S. PATENT DOCUMENTS 4,513,319  4/1985  Breimer et al. ......................... 348/188
4,761,685  8/1988  Asaida et al. .......................... 348/188
5,140,418  8/1992  Rivamonte ............................. 348/188
5,444,481  8/1995  Ohshima et al. ....................... 348/187

Primary Examiner—Wendy Garber
Assistant Examiner—Tuan V. Ho
Attorney, Agent, or Firm—Pollock, Vande Sande & Priddy

[57] ABSTRACT

A three-dimensional resolution chart is used to adjust the position of a solid-state image detector 4 in a given image-forming optical system. A plurality of blocks 10a are provided on an upper surface of a resolution chart 10. Each block 10a has an adjusting pattern A-D depicted on a slant surface thereof. An image of each adjusting pattern A-D is formed on the solid-state image detector 4 through a master lens 2. The contrast integration value F is calculated based on the image of the adjusting pattern at each of a plurality of designated areas hj (j=1 - - - n) on the slant surface of each block 10a provided on the resolution chart 10, to find out a specific position on each block where the contrast integration value F becomes maximum, thereby identifying the specific position as focus point of the master lens 2. The back focus of the solid-state image detector 4 is calculated based on thus obtained focus point. An optimum gradient ($\alpha$, $\beta$) of the solid-state image detector 4 is calculated based on three-dimensional relationship between plural focus points of the master lens 2 detected on the plural blocks 10a. Finally, each positioning mechanism 11 adjusts each solid-state image detector 4 to the calculated optimum position or at the optimum gradient.

11 Claims, 26 Drawing Sheets

ENLARGED VIEW OF PORTION "A"

TV MONITOR IMAGE

TV MONITOR IMAGE

FIG. 32
PRIOR ART
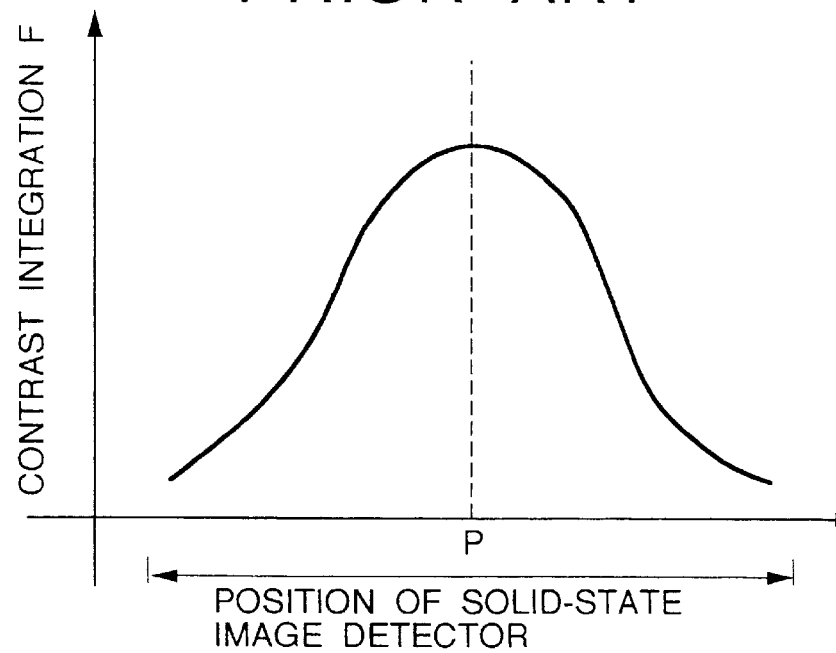
P : FOCUS POINT OF MASTER LENS
FIG. 33
PRIOR ART
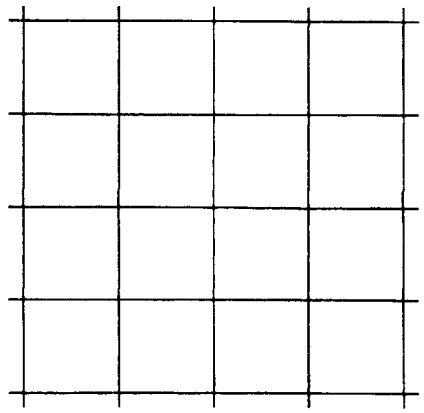
SUBSTANCE (OBJECT)
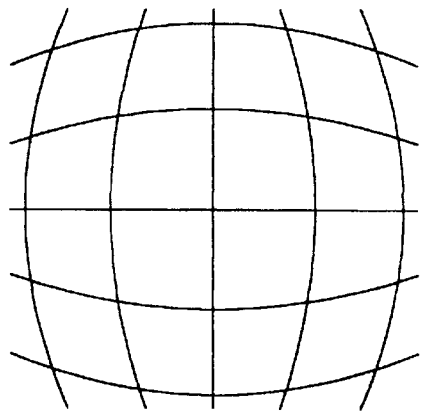
IMAGE

METHOD FOR ADJUSTING A POSITION OF A SOLID-STATE IMAGE DETECTOR IN A GIVEN IMAGE-FORMING OPTICAL SYSTEM

BACKGROUND OF THE INVENTION

1. Field of the Invention

The present invention generally relates to a method for adjusting the back focus and the gradient of a solid-state image detector, such as CCD (Charge Coupled Device), and more particularly to a novel position adjusting method for a solid-state image detector capable of speedily positioning the solid-state image detector at an optimum position in the image-forming optical system.

2. Prior Art

A conventional method for positioning a solid-state image detector at a desired position in the image-forming optical system will be explained with reference to FIGS. 29 through 32.

FIG. 29 is a schematic view showing a conventional system for positioning a solid-state image detector at a desired position in the image-forming optical system.

In FIG. 29, a two-dimensional resolution chart (hereinafter referred to as 2-D resolution chart) 1 is provided in front of a master lens 2. This 2-D resolution chart 1 is characterized in that an alternate black-and-white pattern, serving as an adjusting pattern 1a, is provided at each of four corners of the rectangular 2-D resolution chart 1, as shown in FIG. 30. Each adjusting pattern 1a is used for detecting the focus point of master lens 2.

More specifically, a light beam, emitted from a light source 15 placed at an obliquely outward position from 2-D resolution chart 1, reaches the surface of 2-D resolution chart 1 at a given incident angle, and then reflects from the surface of 2-D resolution chart 1 toward master lens 2. Thus, the reflection light image of 2-D resolution chart 1 reaches the master lens 2.

A color separation prism 3, which is used to separate an entered light into three color components, R, G and B, is disposed behind the master lens 2. For receiving each of these color components R, G and B, a total of three solid-state image detectors 4 are independently disposed around the color separation prism 3 in a close confronting relationship. Each solid-state image detector 4 is connected to a video signal processing circuit 5 which is further connected to a TV monitor 6.

Positioned behind each solid-state image detector 4 is a positioning mechanism 7 which moves or shifts the solid-state image detector 4 to the focus point of master lens 2. A correction drive circuit 8 is connected to each of positioning mechanisms 7 to control them. The correction drive circuit 8 is connected to a calculating circuit 9a, which is one of circuits in a VME system 9. In addition to this calculating circuit 9a, VME system 9 further comprises an image processing board 9b and a digital conversion circuit 9c.

The calculating circuit 9a has a function of calculating an integration (or accumulation) value with respect to the contrast. The image processing board 9b has a frame memory. The digital conversion circuit 9c has a function of converting a video signal received from the video signal processing circuit 5 into a digital signal.

An operation of the above-described conventional solid-state image detector positioning system will be explained hereinafter.

In FIG. 29, the image of 2-D resolution chart 1 is formed on the solid-state image detector 4 through master lens 2. The video signal of 2-D resolution chart 1, which is an electric signal generated from the solid-state image detector 4, is entered into the video signal processing circuit 5 and then displayed on the TV monitor 6. The output signal of video signal processing circuit 5 is also fed to the digital conversion circuit 9c in the VME system 9 where the entered video signal is converted into a digital signal.

The image processing board 9b receives the digital signal from the digital conversion circuit 9c and stores the digitized video data in the frame memory thereof. The calculating circuit 9a in the VME system 9 arithmetically obtains the "contrast integration value" based on the digital video data representing the alternate pattern of the 2-D resolution chart 1 which is stored in the frame memory of image processing board 9b.

The "contrast integration value" represents an integration or accumulation of all the luminance-differences between adjacent two pixels on the entire video image displayed on the TV monitor 6. Having a large contrast integration value is having a higher resolution in the output image. In other words, it is believed that the focus point of master lens 2 is accurately positioned on the solid-state image detector 4. Thus, by detecting the contrast integration value, it can be confirmed that the concerned solid-state image detector is surely positioned at a desirable position in the image-forming optical system.

Next, the positioning mechanism 7 slightly shifts the corresponding solid-state image detector 4 in the direction of the optical axis direction "Z". After finishing the slight shifting operation of the solid-state image detector 4, the above-described sequential operations are repeated again to arithmetically obtain a new contrast integration value at a resultant position of solid-state image detectors 4.

Furthermore, solid-state image detector 4 is slightly shifted in the direction of optical axis "Z". In response to each shift movement, VME system 9 receives the video signal of solid-state image detector 4 and calculates the contrast integration value, finally obtaining the characteristics of FIG. 32 showing contract integration value "F" in relation to solid-state image detector position "D" with respect to the optical axis "Z".

Referring to the characteristics of FIG. 32, it is known that the contrast integration value "F" becomes maximum at the position "P" where the master lens 2 focuses the image. Thus, the positioning mechanism 7 moves the solid-state image detector 4 to thus detected position "P".

In this manner, through the adjustment of the back focus each solid-state image detector 4 can be positioned at the predetermined position in the image-forming optical system.

Next, the conventional method for adjusting the gradient of each solid-state image detector 4 with respect to the image-forming optical system will be explained.

In the VME system 9, digital conversion circuit 9c receives the video signal of 2-D resolution chart 1 and converts it into a digital signal. The image processing board 9b stores the digitized video data in its frame memory. Thereafter, based on these digital video data, calculating circuit 9a arithmetically obtains the contrast integration value of each adjusting pattern 1a located at four corners of the rectangular 2-D resolution chart 1 shown in FIG. 30.

The arithmetically obtained value is then sent to correction drive circuit 8 which actuates the positioning mechanism 7 to slightly incline each solid-state image detector 4 with respect to the optical axis "Z" in the X-axis direction and Y-axis direction.

In response to each of such a slight inclination of solid-state image detector 4, VME system 9 arithmetically obtains a new contrast integration value of each adjusting pattern 1a located at four corners of the rectangular 2-D resolution chart.1. Obtained by repeating the above-described sequential operations is a specific gradient by which the contrast integration value is equalized at all four adjusting patterns 1 of the 2-D resolution chart 1. Then, the position or attitude of each solid-state image detector 4 is adjusted to meet the obtained specific gradient.

In this manner, through the adjustment of gradient each solid-state image detector 4 can be positioned at the predetermined position in the image-forming optical system.

As apparent from the foregoing description, the above-described conventional solid-state image detector positioning system adjusts the back focus of each solid-state image detector by shifting the solid-state image detector in the back-and-forth direction with respect to the optical axis so as to finally detect the focus point of the master lens. Furthermore, the above-described conventional solid-state image detector positioning system adjusts the gradient of each solid-state image detector based on the image displayed on the TV monitor in such a manner that the contrast integration values of all the adjusting patterns located at four corners of 2-D resolution chart can be equalized to the same value. Hence, the inclination of each solid-state image detector in the given image-forming optical system can be correctly adjusted.

However, according to the above-described conventional solid-state image detector positioning system, there was a problem that detection of the focus point of the master lens was troublesome. That is, this conventional method definitely requires to detect the specific position where the contrast integration value becomes maximum, using the image of the 2-D resolution chart obtained by each solid-state image detector. To detect the maximum value of the contrast integration value, it is necessary to shift the solid-state image detector in the back-and-forth direction of the optical axis and to arithmetically find out the maximum value of the contrast integration value by repetitively calculating the contrast integration value in response to each slight movement of the solid-state image detector. Accordingly, it took a long time to finish and was not possible to speed up the detection of the focus point of the master lens.

Furthermore, there was a problem that the detection of gradient of each solid-state image detector was complicated. To obtain an optimum gradient of each solid-state image detector in the image-forming optical system, it is definitely necessary to repetitively swing the solid-state image detector in the horizontal (i.e. X axis) and vertical (i.e. Y axis) directions until the contrast integration values of all the adjusting patterns located at four corners of the 2-D resolution chart are equalized. Hence, it was not possible to speed up the detection of the optimum gradient of each solid-state image detector.

Furthermore, there was a problem that at a certain time during the adjustment it was not possible to obtain the information regarding the present position of the concerned solid-state image detector with respect to the designated position, i.e. with respect to the focus point of the master lens.

Still further, there was a problem that relying on visual adjustment based on the camera image displayed on the monitor screen might fail to accurately detect the focus point of the master lens, although the camera image represents the adjusting pattern of 2-D resolution chart which is obtained from each solid-state image detector.

Furthermore, there was a problem in the image-forming optical system that the far the incident light inclined from the optical axis the greater the image of light deviated or distorted from the position to be derived from the Newtonian formula of focusing of the lens. As a result, distortion aberration will be caused as shown in FIG. 33 wherein the shape of the substance does not completely coincide with the shape of the obtained image. Thus, providing the adjusting patterns at four corners of the resolution chart is subjected to the distortion aberration of the master lens, lowering the detecting accuracy in the detection of the focus point of the master lens.

Furthermore, there will be a problem in the detection of the focus point of the master lens that image magnification may be differentiated by the difference of distance from the master lens.

Yet further, there was the problem that illumination irregularity was caused due to difference of distance between each area on the resolution chart and the illumination light source when the illumination light was entered at a significant incident angle from the light source placed at an obliquely outward position.

The size of the resolution chart will be the problem to be solved when it is large.

Moreover, it will be necessary to adjustment the back focus and the gradient if they are undesireably caused after the solid-state image detector is firmly fixed by adhesive material, because hardening of such adhesive material possibly causes thermal expansion and contraction stress.

SUMMARY OF THE INVENTION

In view of the above-described problems encountered in the prior art, the present invention has a principal object to provide a novel and excellent method for adjusting the position of a solid-state image detector capable of speedily, accurately and easily positioning the solid-state image detector to the predetermined position in a narrow space of the image-forming optical system. Furthermore, the present invention has another object to provide a novel and excellent method for adjusting the position of a solid-state image detector capable of obtaining positional information of the solid-state image detector with respect to the focus point of the master lens during the adjustment and capable of accurately detecting the focus point of the master lens through visual adjustment.

To accomplish above and other related objects, a first aspect of the present invention provides a method for adjusting the position of a solid-state image detector in a given image-forming optical system, comprising steps of: providing a three-dimensional resolution chart comprising a block provided on an upper surface thereof, the block having an adjusting pattern depicted on a slant surface thereof; forming an image of the adjusting pattern of the three-dimensional resolution chart on a solid-state image detector through a master lens; calculating a contrast integration value based on the image of the adjusting pattern at each of a plurality of designated areas on the slant surface of the block provided on the resolution chart, and finding out a specific position where the contrast integration value becomes maximum, thereby identifying the specific position as focus point of the master lens; calculating an optimum position of the solid-state image detector in the given image-forming optical system, based on the focus point; and positioning the solid-state image detector to the optimum position by using a positioning mechanism.

A second aspect of the present invention provides a method for adjusting the position of a solid-state image detector in a given image-forming optical system, comprising steps of: providing a three-dimensional resolution chart comprising a plurality of blocks provided on an upper surface thereof, each block having an adjusting pattern depicted on a slant surface thereof; forming an image of each adjusting pattern of the three-dimensional resolution chart on a solid-state image detector through a master lens; calculating a contrast integration value based on the image of the adjusting pattern at each of a plurality of designated areas on the slant surface of each block provided on the resolution chart, and finding out a specific position on each block where the contrast integration value becomes maximum, thereby identifying the specific position as focus point of the master lens; calculating an optimum gradient of the solid-state image detector in the given image-forming optical system, based on three-dimensional relationship between plural focus points of the master lens detected on the plural blocks; and adjusting an actual gradient of the solid-state image detector to the optimum gradient by using a positioning mechanism.

A third aspect of the present invention provides a method for adjusting the position of a solid-state image detector in a given image-forming optical system, comprising steps of: providing a three-dimensional resolution chart comprising a block provided on an upper surface thereof and a reference plane, the block having a first adjusting pattern depicted on a slant surface thereof and the reference plane having a second adjusting pattern depicted thereon; forming images of the first and second adjusting patterns of the three-dimensional resolution chart on a solid-state image detector through a master lens; calculating a contrast integration value based on the image of the first adjusting pattern at each of a plurality of designated areas on the slant surface of the block provided on the resolution chart, and finding out a specific position where the contrast integration value becomes maximum, thereby identifying the specific position as focus point of the master lens; obtaining a center-of-gravity position of the second adjusting pattern based on the image of the second adjusting pattern; calculating an optimum position of the solid-state image detector in the given image-forming optical system, based on the focus point and the center-of-gravity position; and positioning the solid-state image detector to the optimum position by using a positioning mechanism.

A fourth aspect of the present invention provides a method for adjusting the position of a solid-state image detector in a given image-forming optical system, comprising steps of: providing a three-dimensional resolution chart comprising a plurality of blocks provided on an upper surface thereof and a reference plane, each block having a first adjusting pattern depicted on a slant surface thereof and the reference plane having a second adjusting pattern depicted thereon so as to correspond to the first adjusting pattern; forming images of the first and second adjusting patterns of the three-dimensional resolution chart on a solid-state image detector through a master lens; calculating a contrast integration value based on the image of the first adjusting pattern at each of a plurality of designated areas on the slant surface of each block provided on the resolution chart, and finding out a specific position where the contrast integration value becomes maximum, thereby identifying the specific position as focus point of the master lens; obtaining a center-of-gravity position of the second adjusting pattern based on the image of the second adjusting pattern; calculating an optimum gradient of the solid-state image detector in the given image-forming optical system, based on three-dimensional relationship between plural focus points of the master lens detected on the plural blocks and the center-of-gravity position corresponding to each of the focus points; and adjusting an actual gradient of the solid-state image detector to the optimum gradient by using a positioning mechanism.

A fifth aspect of the present invention provides a method for adjusting the position of a solid-state image detector in a given image-forming optical system, comprising steps of: providing a three-dimensional resolution chart comprising a block provided on an upper surface thereof, the block having an adjusting pattern depicted on a slant surface thereof; forming an image of the adjusting pattern of the three-dimensional resolution chart on a solid-state image detector through a master lens; calculating a contrast integration value based on the image of the adjusting pattern at each of a plurality of designated areas on the slant surface of the block provided on the resolution chart, and finding out a specific position where the contrast integration value becomes maximum, thereby identifying the specific position as focus point of the master lens; displaying a composite image by superimposing the focus point on the image of the adjusting pattern; and positioning the solid-state image detector to a predetermined position based on the displayed composite image by using a positioning mechanism.

A sixth aspect of the present invention provides a method for adjusting the position of a solid-state image detector in a given image-forming optical system, comprising steps of: providing a three-dimensional resolution chart comprising a plurality of blocks provided on an upper surface thereof, each block having an adjusting pattern depicted on a slant surface thereof; forming an image of each adjusting pattern of the three-dimensional resolution chart on a solid-state image detector through a master lens; calculating a contrast integration value based on the image of the adjusting pattern at each of a plurality of designated areas on the slant surface of each block provided on the resolution chart, and finding out a specific position where the contrast integration value becomes maximum, thereby identifying the specific position as focus point of the master lens on each of the plural blocks; displaying a composite image by superimposing plural focus points on corresponding images of the plural adjusting patterns; and adjusting an actual gradient of the solid-state image detector to an optimum gradient based on the composite image by using a positioning mechanism.

According to features of the preferred embodiments of the present invention, it is desirable that the adjusting pattern depicted on the slant surface of the block of the three-dimensional resolution chart is capable of correcting distortion aberration of the master lens.

It is also preferable that the adjusting pattern depicted on the slant surface of the block of the three-dimensional resolution chart is capable of correcting image magnification difference between slant surface elements on the block when the image magnification is differentiated at each of slant surface elements on the block due to difference of distance from the master lens.

It is also preferable that the resolution chart allows light to penetrate the body thereof, and a light source is disposed behind the resolution chart so as to allow light emitted from the light source to pass through the body of the resolution chart and being image formed on the solid-state image detector. This resolution chart can be incorporated into the master lens.

Still further, a seventh aspect of the present invention provides a method for adjusting the position of a solid-state image detector in a given image-forming optical system, comprising steps of: providing a three-dimensional resolution chart comprising a plurality of blocks provided on an upper surface thereof, each block having an adjusting pattern depicted on a slant surface thereof; forming an image of each adjusting pattern of the three-dimensional resolution chart on a solid-state image detector through a master lens; calculating a contrast integration value based on the image of the adjusting pattern at each of a plurality of designated areas on the slant surface of each block provided on the resolution chart, and finding out a specific position on each block where the contrast integration value becomes maximum, thereby identifying the specific position as focus point of the master lens; calculating an optimum gradient of the solid-state image detector in the given image-forming optical system, based on three-dimensional relationship between plural focus points of the master lens detected on the plural blocks; and adjusting an actual gradient of the solid-state image detector to the optimum gradient by using a positioning mechanism, wherein one of the plural blocks is capable of measuring a predetermined different or supplementary area in addition to an ordinary measuring area common to other blocks, thereby allowing a wide range of measurement of the focus point of the master lens.

Yet further, an eighth aspect of the present invention provides a method for adjusting the position of a solid-state image detector in a given image-forming optical system, comprising steps of: bonding a solid-state image detector at a predetermined position in the given image-forming optical system by means of adhesive material; providing a three-dimensional resolution chart comprising a block provided on an upper surface thereof, the block having an adjusting pattern depicted on a slant surface thereof; forming an image of the adjusting pattern of the three-dimensional resolution chart on the solid-state image detector through a master lens, after the adhesive material is hardened; calculating a contrast integration value based on the image of the adjusting pattern at each of a plurality of designated areas on the slant surface of the block provided on the resolution chart; and finding out any positional dislocation of the solid-state image detector from the predetermined when the positional dislocation is caused due to hardening of the adhesive material.

BRIEF DESCRIPTION OF THE DRAWINGS

The above and other objects, features and advantages of the present invention will become more apparent from the following detailed description which is to be read in conjunction with the accompanying drawings, in which:

FIG. 32 is a graph showing the characteristics of contrast integration value in accordance with the conventional solid-state image detector positioning system; and FIG. 33 is a view illustrating the distortion aberration of the lens based on the difference between the shape of a substance and the shape of the obtained image.

DETAILED DESCRIPTION OF THE PREFERRED EMBODIMENTS

Figure 1:
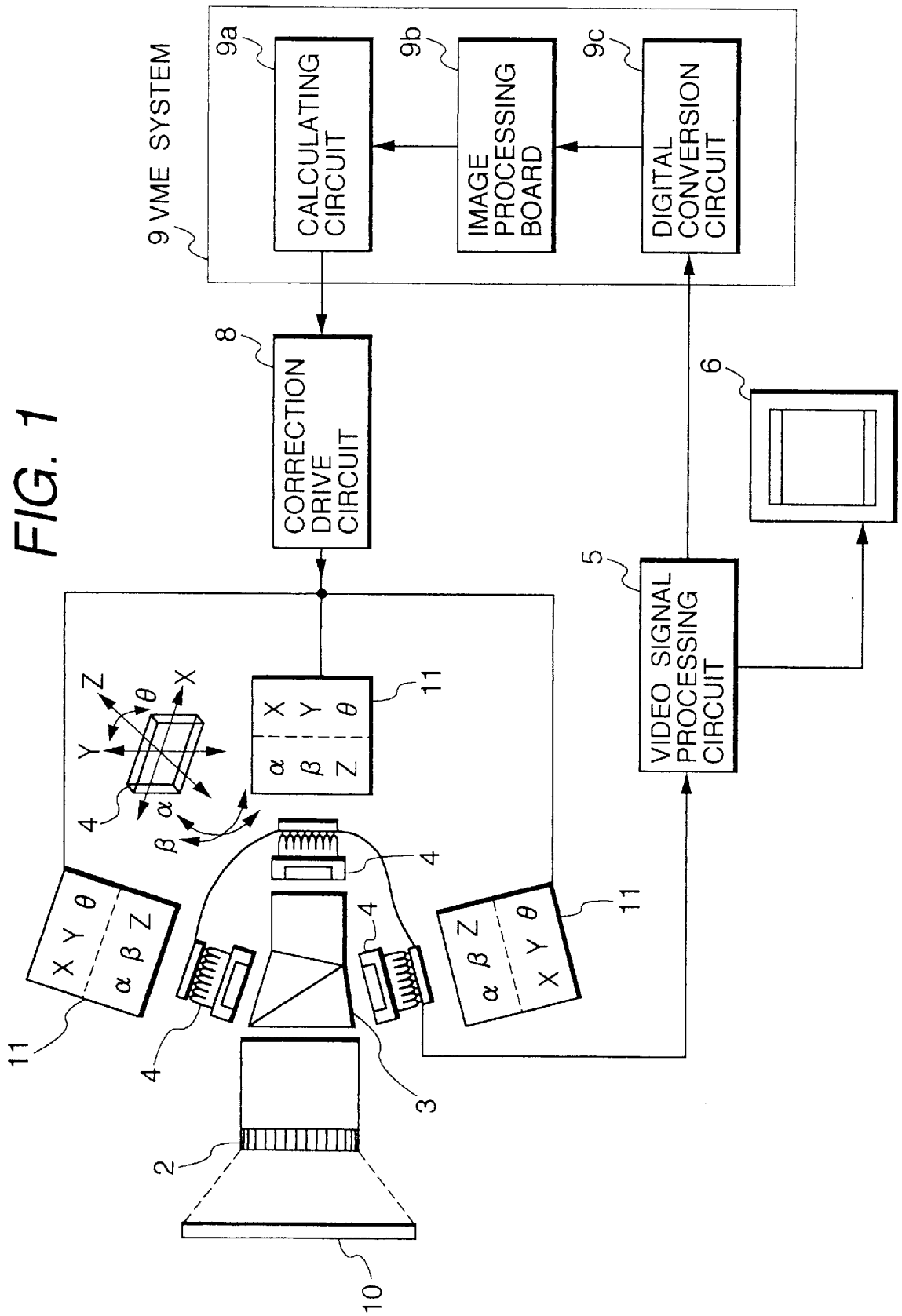
FIG. 1 is a view showing a schematic arrangement of a solid-state image detector positioning system in accordance with a first embodiment of the present invention.

Preferred embodiments of the present invention will be explained in greater detail hereinafter, with reference to the accompanying drawings. Identical parts are denoted by identical reference numerals throughout the views.

First Embodiment

FIG. 1 is a view showing a schematic arrangement of a solid-state image detector positioning system in accordance with a first embodiment of the present invention.

Figure 29:
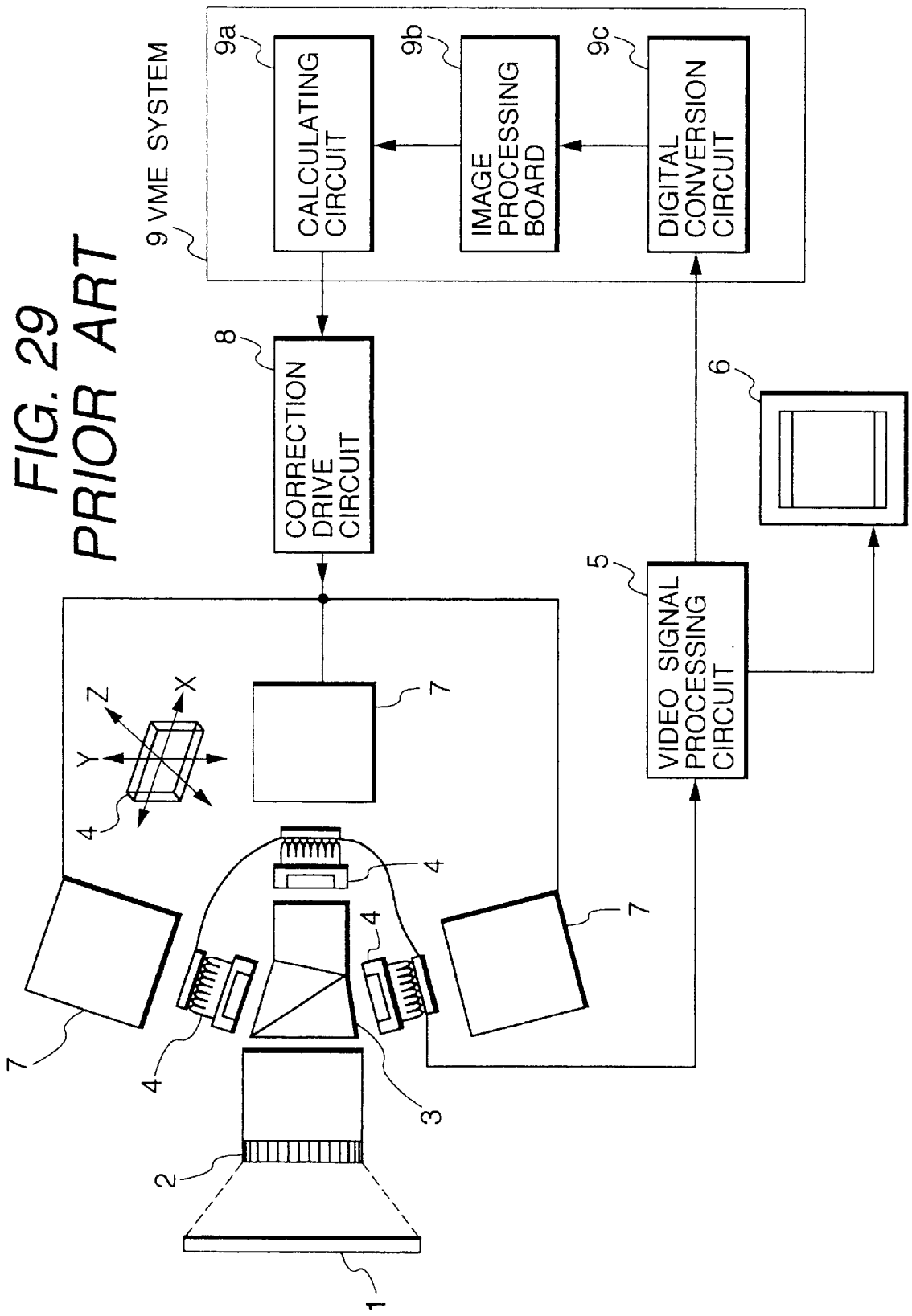
FIG. 29 is a view showing a schematic arrangement of a conventional solid-state image detector positioning system.
Figure 30:
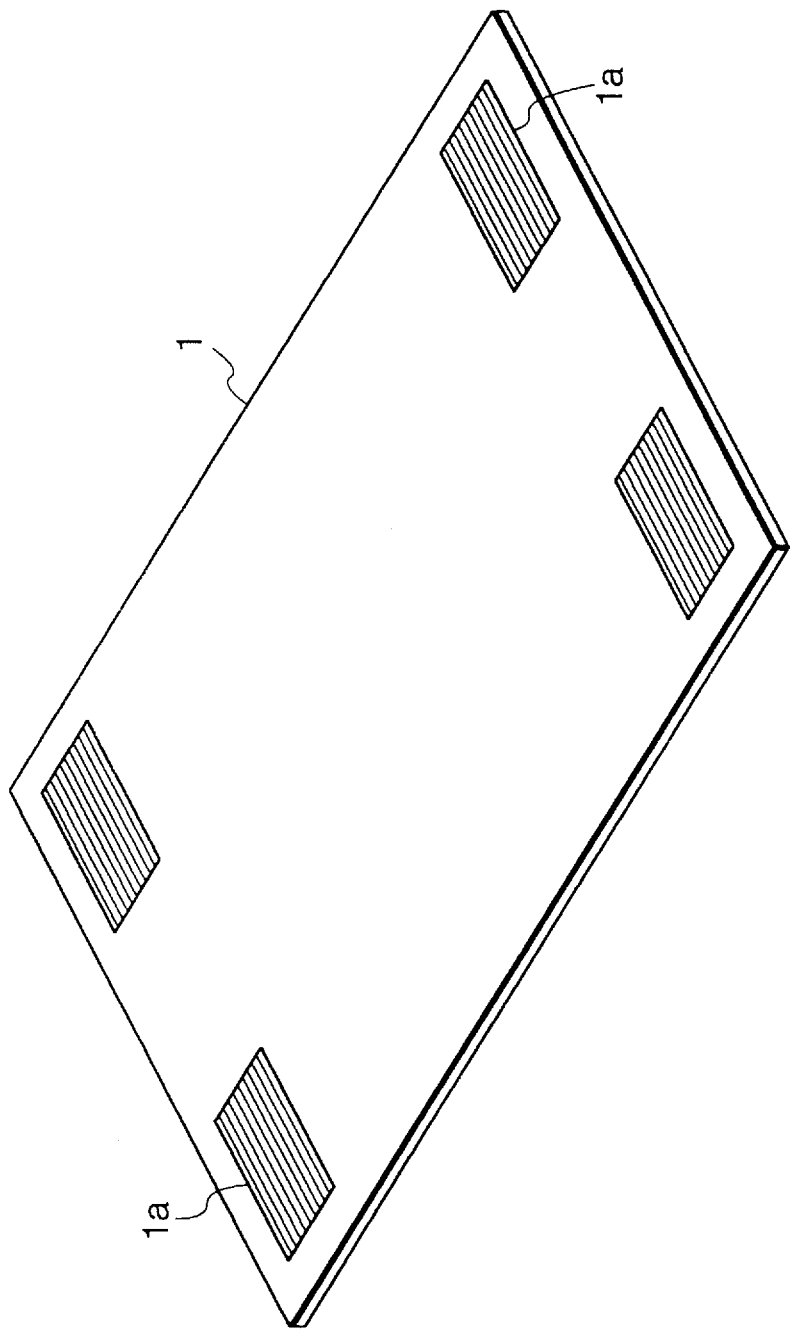
FIG. 30 is a perspective view showing a two-dimensional resolution chart used in the conventional solid-state image detector positioning system.
Figure 31:
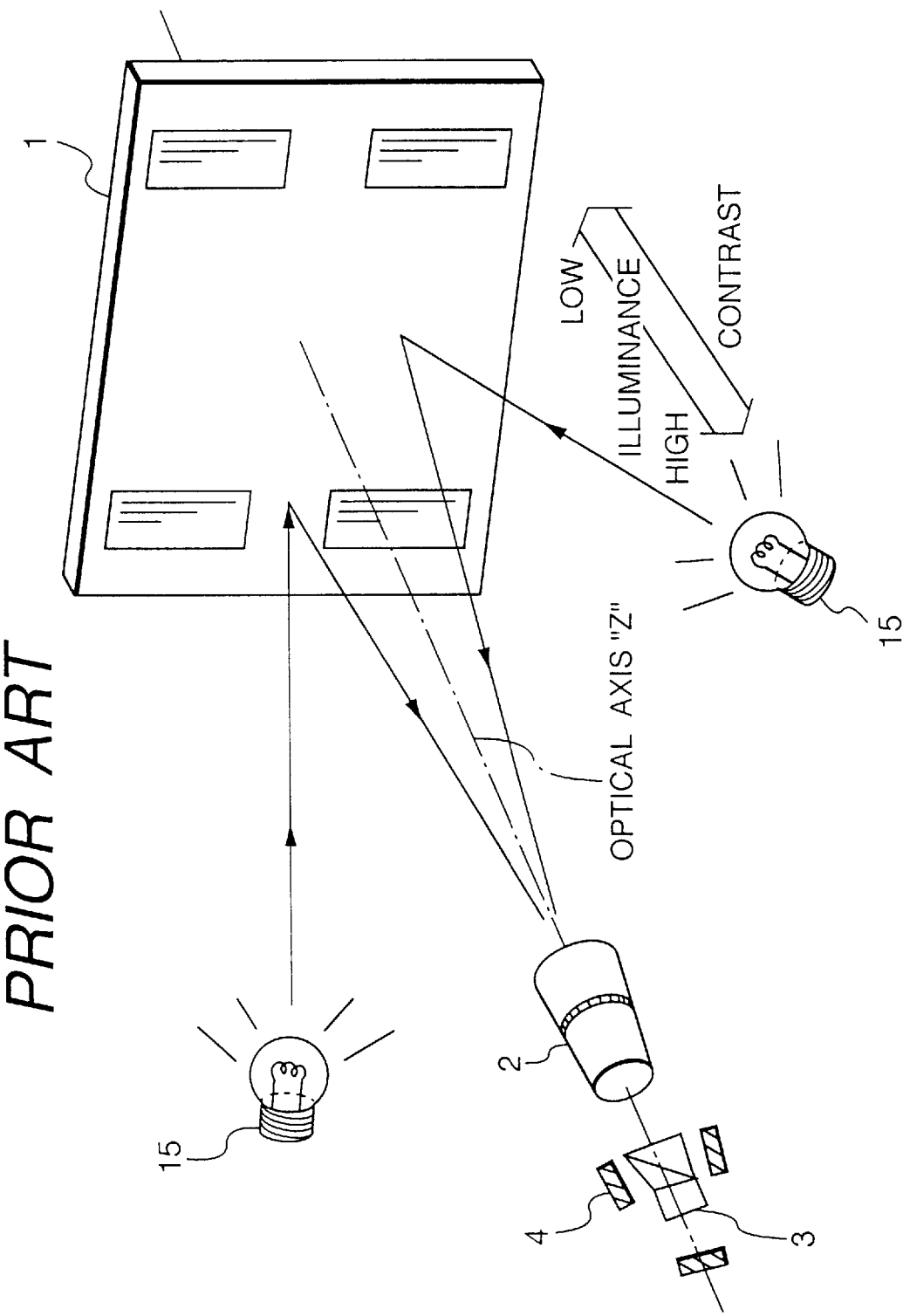
FIG. 31 is a perspective view illustrating a conventional method for illuminating the conventional resolution chart.

As shown in FIG. 1, the arrangement of the first embodiment is different from the conventional system shown in FIG. 29 in the configuration of the resolution chart. Namely, there is provided a three-dimensional resolution chart 10 for detecting the focus point of master lens 2. Therefore, the features different from the conventional system will be chiefly explained hereinafter, avoiding the duplicate explanation of the components already explained with reference to FIG. 29.

In FIG. 1, a three-dimensional resolution chart (hereinafter referred to as 3-D resolution chart) 10 is disposed in front of master lens 2 to detect the focus point of master lens 2. This 3-D resolution chart 10 is characterized in that three-dimensional adjusting patterns A to D are disposed at four corners of the rectangular plane of resolution chart 10.

Figure 2:
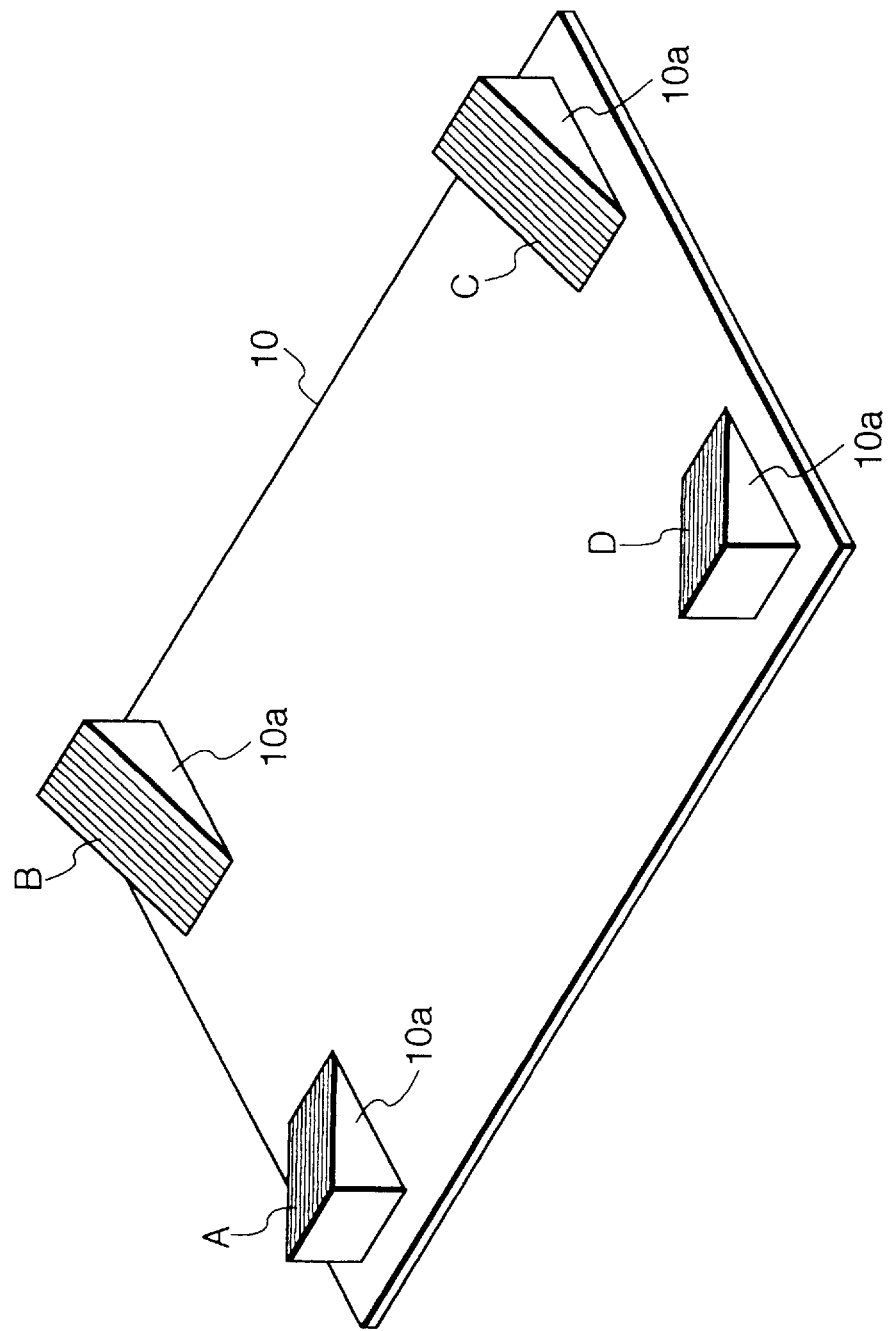
FIG. 2 is a perspective view showing a three-dimensional resolution chart in accordance with the first embodiment of the present invention.

More specifically, as shown in FIG. 2, each of the three-dimensional adjusting patterns A to D is an adjusting pattern depicted on a slant flat surface of a triangular block 10a. The slant flat surface of each triangular block 10a is inclined along its longitudinal direction. A transversal direction of the slant flat surface is parallel to the upper surface of the resolution chart 10.

Adjusting patterns A and B, located at two corners of one side of the rectangular plane of resolution chart 10, are disposed in such a manner that their slant flat surfaces incline inward and confront with each other. Adjusting patterns C and D, located at another two corners of the other side of the rectangular plane of resolution chart 10, are disposed in such a manner that their slant flat surfaces incline inward and confront with each other.

On the slant flat surface of each triangular block 10a, alternate black-and-white stripes extend in the longitudinal direction of the slope at the predetermined intervals in the transversal direction normal to the slope. The direction of stripes is normal to the transverse direction of the slant surface, which is parallel to the upper surface of resolution chart 10.

Furthermore, another characteristic feature of the first embodiment resides in a positioning mechanism 11 which shifts each solid-state image detector 4 to the focus point of master lens 2. Each positioning mechanism 11, as shown in FIG. 1, has the capability of adjusting a corresponding solid-state image detector 4 along each of the principal six axes, i.e. horizontal direction "X", vertical direction "Y", optical axis direction "Z", rotational direction θ about the optical axis, gradient α with respect to the horizontal direction "X", and gradient β with respect to the vertical direction "Y".

VME system 9 arithmetically obtains the correction data for the focus point of master lens 2 based on the camera image taken by solid-state image detectors 4. The correction drive circuit 8 receives thus obtained correction data and drives each positioning mechanism 11 in accordance with the correction data.

A position adjusting method of the first embodiment for accurately positioning each solid-state image at a predetermined position in the image-forming optical system will be explained hereinafter.

In FIG. 1, light, after crossing master lens 2, enters the color separation prism 3 and is separated into three color components R, G and B. Each color component R, G or B is converted into an electric signal through each solid-state image detector 4. The image of 3-D resolution chart 10 is formed on the solid-state image detector 4 through master lens 2.

The video signal, converted into an electric signal through each solid-state image detector 4, is entered into the video signal processing circuit 5. Based on this video signal, the image of 3-D resolution chart 10 is displayed on the TV monitor 6. Meanwhile, the video signal is entered into the digital conversion circuit 9c of VME system 9, where the video signal is converted into a digital signal. And then, the content of the digital signal is temporarily stored in the image processing board 9b, by writing the digital data into the frame memory thereof. Subsequently, the registration deviation (or dislocation), when caused between images formed on plural solid-state image detectors 4, is corrected by the cooperation of VME system 9, correction drive circuit 8 and positioning mechanism 11.

Next, an operation for correcting the above-described registration deviation will be explained hereinafter.

Figure 3:
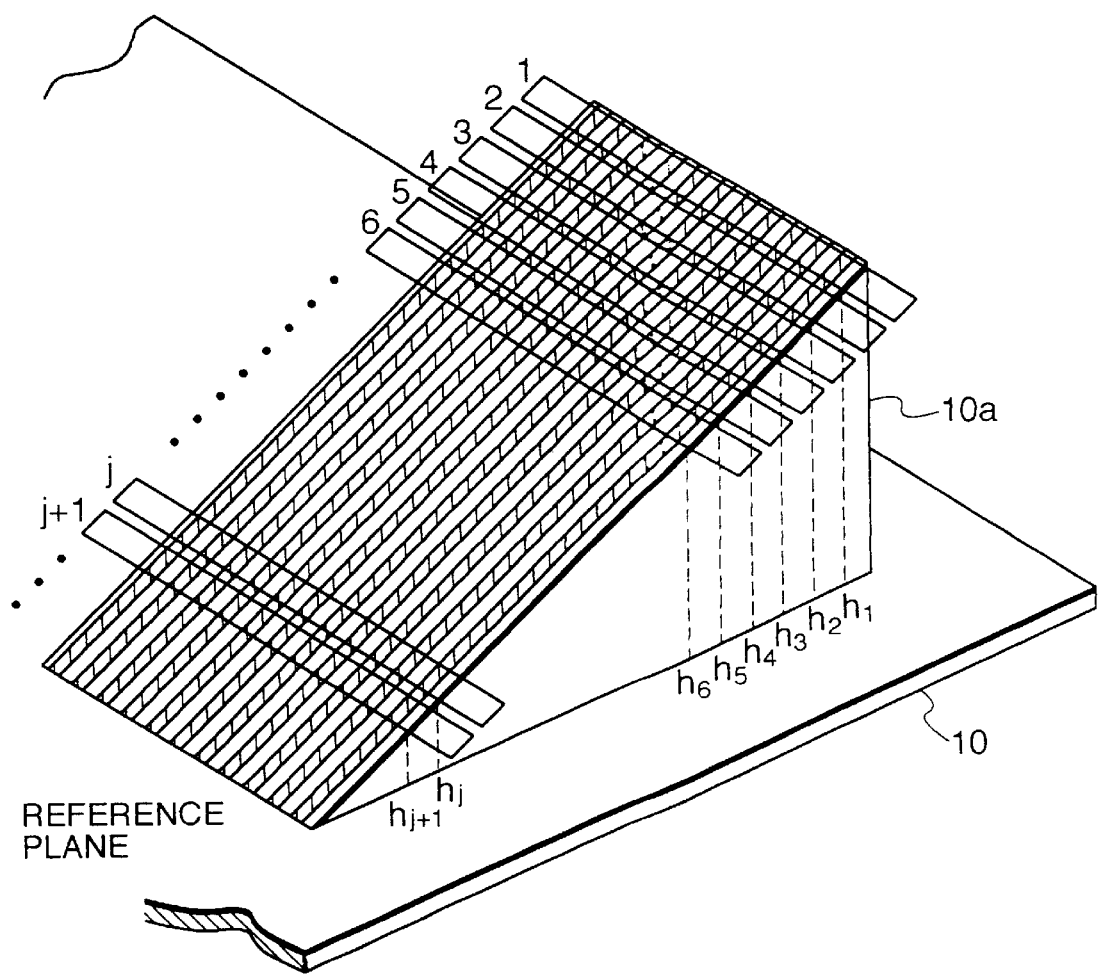
FIG. 3 is an enlarged perspective view showing details of the three-dimensional resolution chart in accordance with the first embodiment of the present invention.
Figure 4:
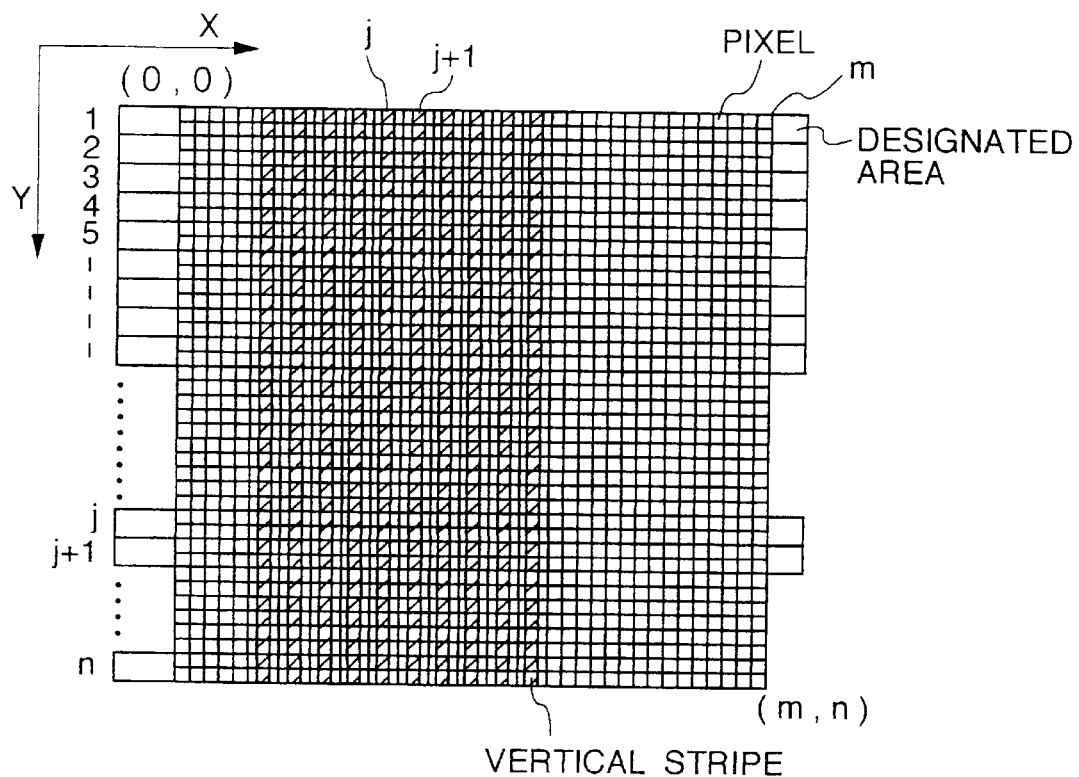
FIG. 4 is a view showing the configuration of a frame memory in an image processing board in accordance with the first embodiment of the present invention.

First, adjustment of the back focus of each solid-state image detector will be explained, with reference to FIGS. 3 and 4. FIG. 3 shows the details of each of adjusting patterns A through D depicted on the triangular block 10a, while FIG. 4 shows the image data written into the frame memory of image processing board 9b in the VME system 9. As shown in FIG. 4, the frame memory stores the image of stripes depicted on the adjusting pattern of FIG. 3. In FIG. 4, the X direction is a scanning direction of the TV monitor 6.

Among image data written into the frame memory, a plurality of areas are allocated as specifically designated areas. Each designated area is used for obtaining the contrast integration value "F". Based on the layout of the frame memory where odd field pixel lines and even field pixel lines are alternately arranged, a combination of adjacent two pixel lines is allocated as a single designated area.

The contrast integration value "F" represents a summation of the luminance differences of all the adjacent pixels consisting of the video image displayed on the TV monitor 6. In general, the contrast integration value for the j-th designated area is expressed by the following equation (1).

$$Fj = \sum_{i=0}^{n-1} |P_{i+1} - P_i| \quad (1)$$

The contrast integration value "F", when its value is large, indicates the fact that the luminance difference is large between black and white and, accordingly, the displayed image on the TV monitor 6 is clear. In other words, it indicates that the focus point of the master lens 2 coincides with the camera face of the solid-state image detector 4.

The contrast integration value Fj (j=1,2, - - - ,n−1) is obtained in each of designated areas of the frame memory shown FIG. 4. Then, by comparing the resultant values among Fj (j=1,2, - - - ,n−1), one designated area having the most largest contrast integration is detected.

Then, by checking the positional relationship between the 3-D resolution chart of FIG. 3 and the image data arrangement in the frame memory of FIG. 4, it becomes possible on the 3-D resolution chart 10 to identify a portion having the most largest contrast integration.

More specifically, on the slant surface of the rectangular block 10a on which each of adjusting patterns A through D is provided, an area having the most largest contrast integration value is identified. The identified area in this manner just corresponds to the focus point of the master lens 2. Then, a height h of the identified area is measured from the reference plane (i.e. the flat upper surface) of the resolution chart 10.

Figure 5:
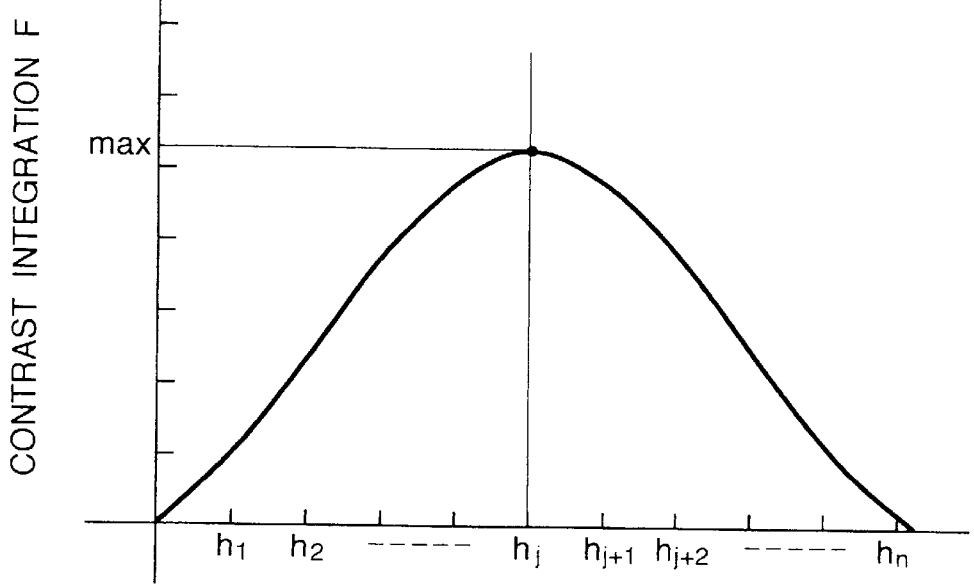
FIG. 5 is a graph showing the characteristics of contrast integration value in a designated area in the frame memory in accordance with the first embodiment of the present invention.

Assuming that the j-th area has the maximum contrast integration value, the relationship between the contrast integration value F and the height h of the designated area will be obtained as shown in FIG. 5.

The above-described processing is performed with respect to each of solid-state image detectors 4 detecting R, G and B color components.

After finishing the above-described operation of identifying the maximum contrast integration area, the correction drive circuit 7 controls each positioning mechanism 11 to adjust each solid-state image detector 4 in the optical axis direction Z so as to correct the height h from the reference plane which corresponds to the focus point of master lens 2. In other words, the shift adjustment of each solid-state image detector 4 along the Z direction is simply (at one time) accomplished, without performing the slight adjustment repetitively.

Next, the gradient adjustment for the solid-state image detector will be explained. The gradient is an inclination of the solid-state image detector, and more particularly an angle out of perpendicular with respect to the optical axis.

As described above, the video signal is sent from each solid-sate image detector 4 to the digital conversion circuit 9c and converted into the digital signal which is stored in the frame memory of the image processing board 9b in the VME system 9.

Then, using adjusting patterns A through D on the triangular blocks 10a located at four corners of the 3-D resolution chart 10 shown in FIG. 2, the contrast integration maximum area is arithmetically obtained to find out the focus point of master lens 2 in each corner of the 3-D resolution chart 10.

Next, on the slant surface of each triangular block 10a having the adjusting pattern thereon, a height h of the maximum contrast integration area, i.e. the position of the focus point of master lens 2, is measured from the reference plane, in order to check the difference among four adjusting patterns A through D.

If the gradient α and the gradient β of the solid-state image detector 4 are not inclined with respect to the optical axis (i.e. Z direction), the height h of the maximum contrast integration area from the reference plane will be the same value at each of four adjusting patterns A through D on the triangular blocks 10a located at four corners of resolution chart 10.

Figure 6:
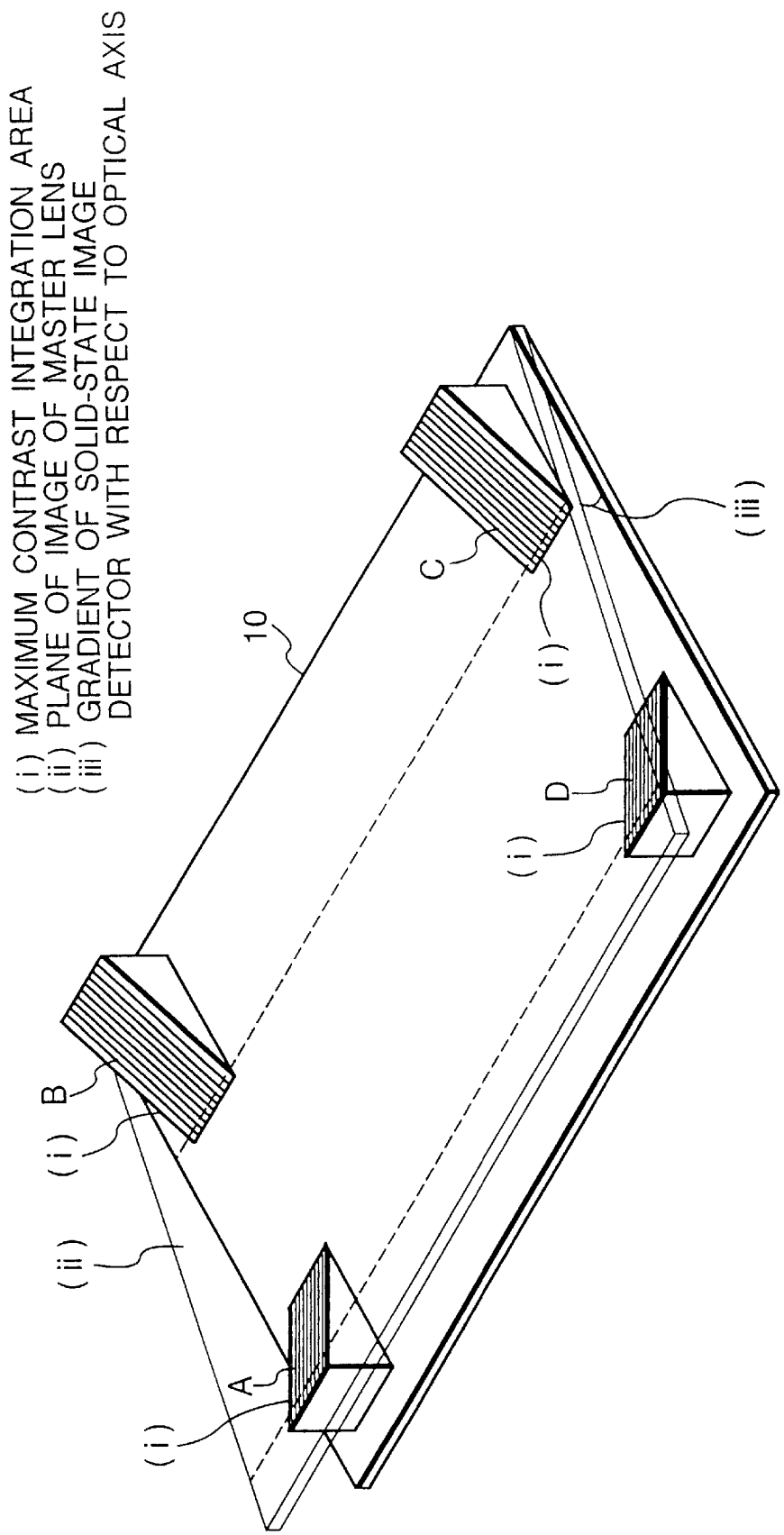
FIG. 6 is a perspective view showing the three-dimensional resolution chart in relation to the gradient of a solid-state image detector in accordance with the first embodiment of the present invention.

Meanwhile, if the gradient α and the gradient β are inclined with respect to the optical axis "Z", the height h of the maximum contrast integration area from the reference plane will not be the same value at each of four adjusting patterns A through D, as shown in FIG. 6.

Each of adjusting patterns A through D is placed on the slant surface of the triangular block 10a of 3-D resolution chart 10; thus, any detecting position can be measured in terms of the depth in the optical axis Z direction when the maximum contrast integration point is detected along the slant surface on each adjusting pattern of 3-D resolution chart 10.

Thus, the gradient of each solid-state image detector 4 with respect to the image-forming optical system can be arithmetically obtained by referring to the three-dimensional relationship between the maximum contrast integration points on four adjusting patterns A through D on the triangular blocks 10a located at four corners of resolution chart 10 each representing the focus point of master lens 2.

Based on thus obtained correction data, the correction drive circuit 8 controls each positioning mechanism 7 so as to change the horizontal gradient α and the vertical gradient β with respect to the optical axis Z, thereby accurately adjusting the actual gradient of each solid-state image detector 4 to the optimum value.

In this manner, the first embodiment of the present invention takes in the image of 3-D resolution chart 10 by three solid-state image detectors 4 through master lens 2, calculates the contrast integration value based on the camera image of the adjusting patterns on the slant surfaces of triangular blocks located at four corners of the resolution chart, and identifies the focus point of the master lens 2 by finding out the maximum contrast integration point in relation to the deviation from the reference plane of the resolution chart. Thus, the first embodiment detects the focus point of master lens 2 without requiring repetitive shift adjustment of each solid-state image detector 4 in the back-and-forth direction of the optical axis.

Furthermore, the first embodiment detects the focus point of master lens 2 at each of four triangular blocks 10a of the 3-D resolution chart 10 based on the camera image of the adjusting pattern provided on the slant surface thereof, calculates the optimum gradient of each solid-state image detector 4 based on the three-dimensional relationship between four maximum contrast points on the triangular blocks located at four corners of the 3-D resolution chart each representing the focus point of master lens 2, adjusts the back focus and the actual gradient of each solid-state image detector 4 by the positioning mechanism 11. Thus, it becomes possible to speedily positioning each solid-state image detector 4 at the optimum position in the image-forming optical system.

Although the above-described first embodiment uses the triangular block 10a, this block 10a can be replaced by any other block having a surface slanting in the depth (or height) direction with respect to the reference plane (i.e. upper surface) of the resolution chart 10.

Second Embodiment

Next, the second embodiment of the present invention will be explained with reference to FIGS. 7 through 13. The second embodiment of the present invention is a solid-state image detector positioning method capable of accurately executing the position adjustment of the solid-state image detector, characterized in that the adjusting pattern is capable of correcting the distortion aberration in advance with respect to the master lens.

Figure 7:
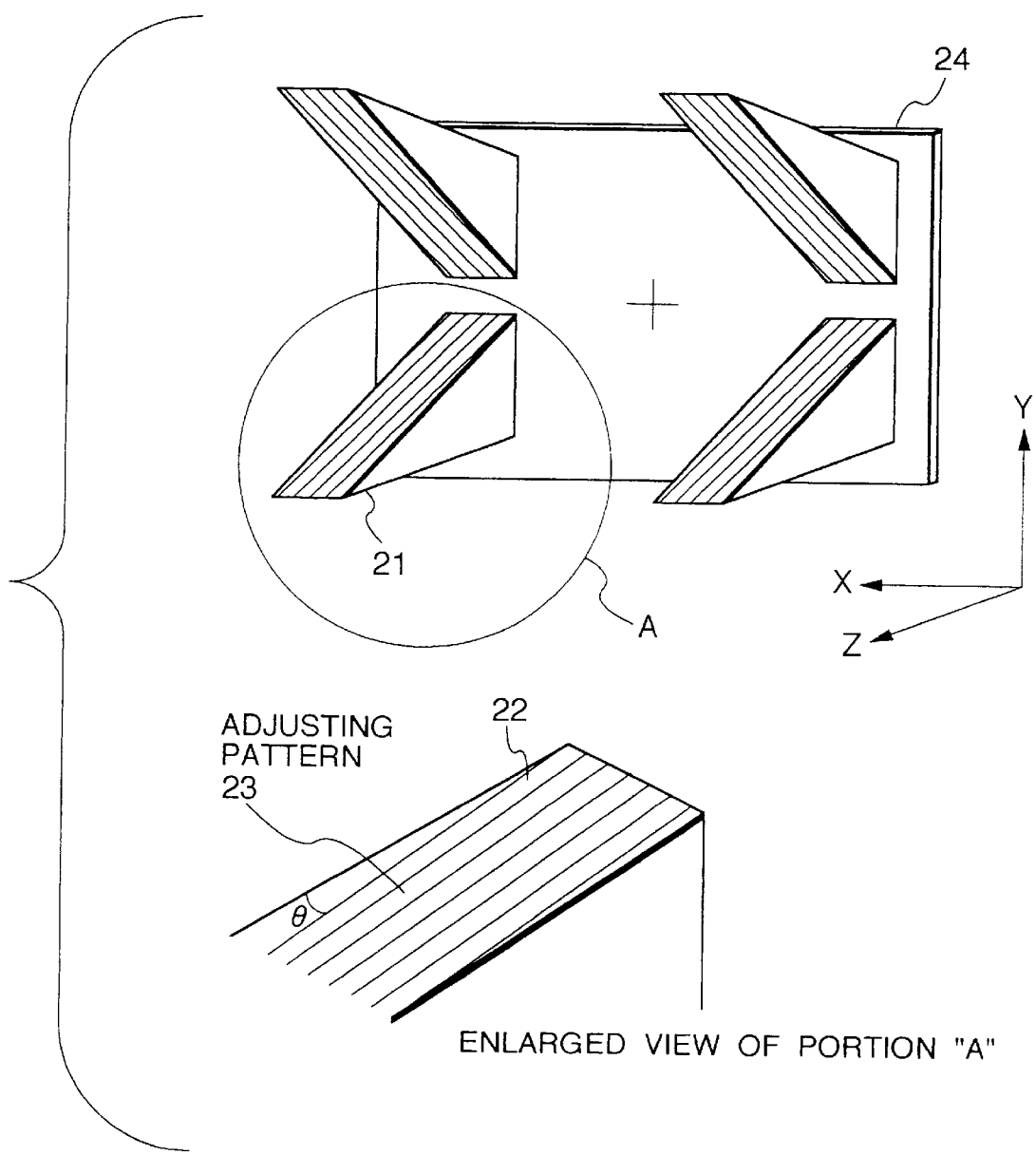
FIG. 7 is a perspective view showing a three-dimensional resolution chart in accordance with a second embodiment of the present invention.

FIG. 7 shows the details of 3-D resolution chart in accordance with the second embodiment of the present invention. In FIG. 7, four triangular blocks 21 are disposed at four corners of rectangular resolution chart 24. Each triangular block 21 has a slant flat surface inclined along its longitudinal direction. A transversal direction of the slant flat surface is parallel to the upper surface of the resolution chart 10.

Each adjusting pattern 23 is stripes depicted on the slant flat surface of each triangular block 21. More specifically, the adjusting pattern 23 consists of parallel alternate black and white lines 22 inclined along the slope at a predetermined angle θ with respect to the longitudinal direction of the slant surface, at predetermined intervals.

Next, an optical system for image-forming the 3-D resolution chart on the solid-state image detector through the master lens will be explained with reference to FIG. 8. This optical system is used for adjusting the gradient of each solid-state image detector.

Figure 8:
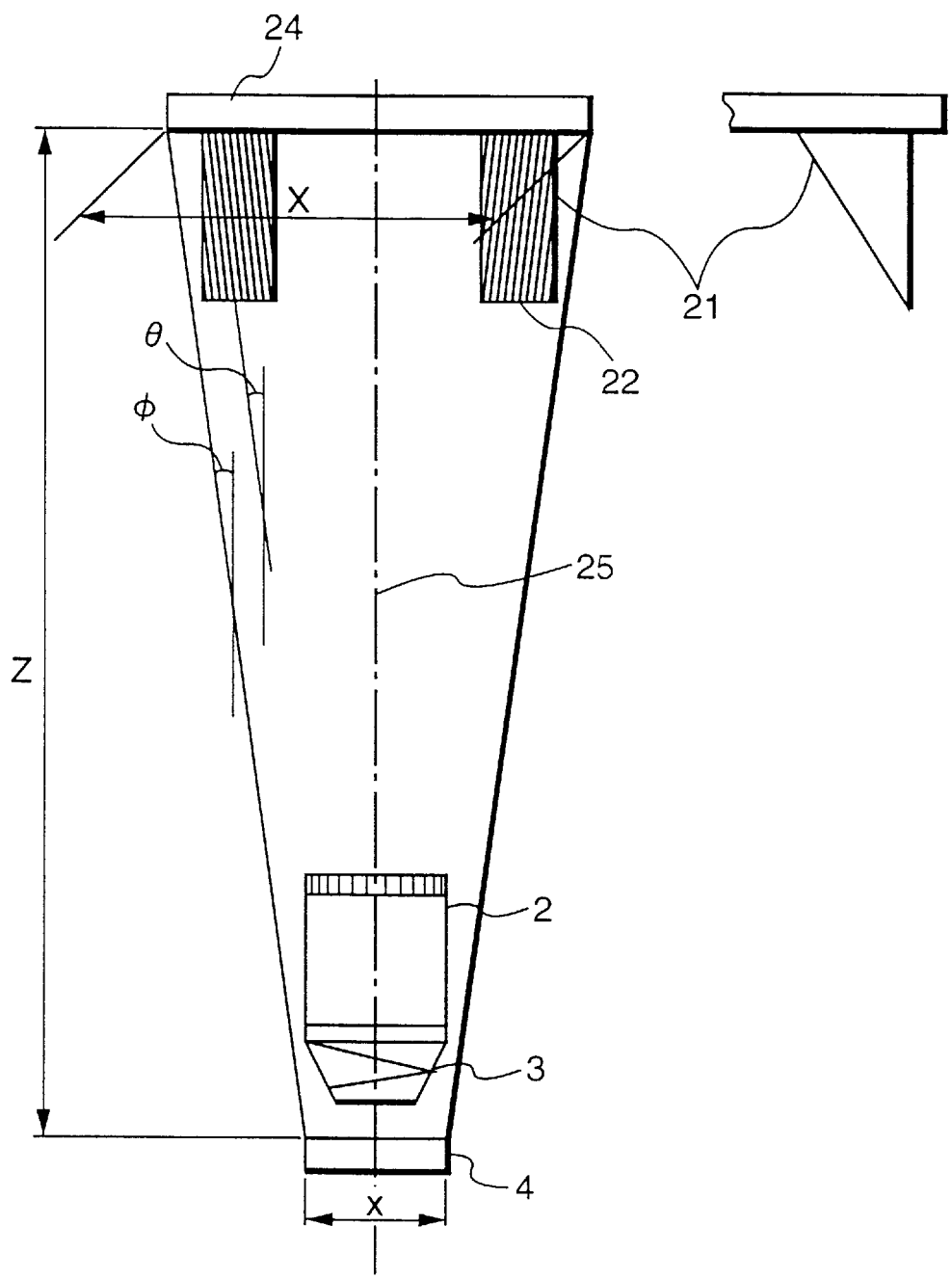
FIG. 8 is a view showing a schematic arrangement of an optical system for forming an image of the three-dimensional resolution chart on the solid-state image detector through a master lens in accordance with the second embodiment of the present invention.

In FIG. 8, the inclined angle θ is expressed by the following equation (2).

$$\tan \theta = \tan \phi = (X-x) / (2Z) \tag{2}$$

where $\phi$ represents an angle between optical axis 25 and inclined line 22, X represents a width of 3-D resolution chart 24, x represents a width of solid-state image detector 4, and Z represents a distance between resolution chart 24 and solid-state image detector 4.

Figure 9:
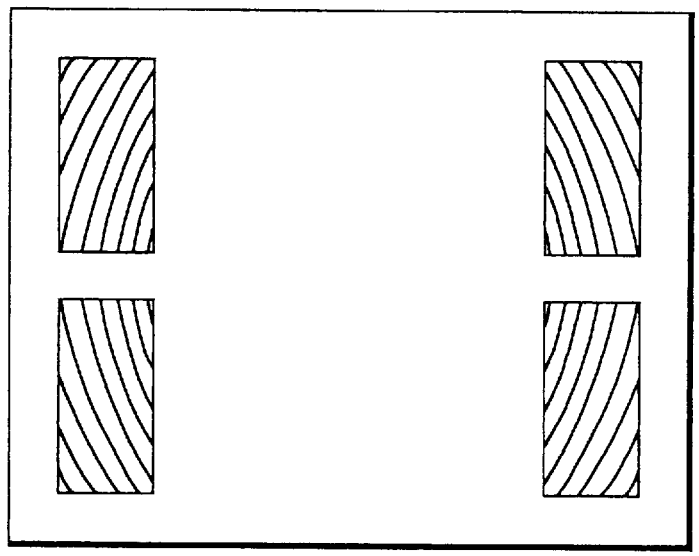
FIG. 9 is a view showing a video image displayed on a TV monitor, where the image of three-dimensional resolution chart is subjected to distortion aberration of the lens.

FIG. 9 shows a video image displayed on a TV monitor obtained under the condition where the image of 3-D resolution chart 24 is subjected to distortion aberration of the master lens 2. The image of straight black-and-white stripes is distorted.

Figure 10:
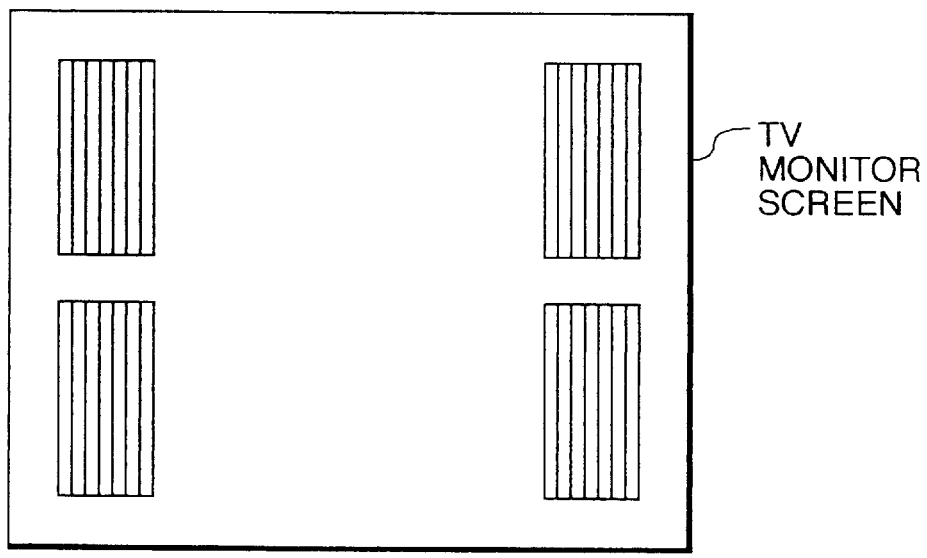
FIG. 10 is a view showing a video image of the three-dimensional resolution chart displayed on the TV monitor in accordance with the second embodiment of the present invention.

FIG. 10 is a video image of 3-D resolution chart 24 to be displayed on the TV monitor 6 in accordance with the second embodiment of the present invention, wherein the image of stripes can be obtained as correct alternate black-and-white lines extending straight with respect to the screen of TV monitor 6, as an effect of inclined layout of stripes by the angle θ.

Next, the gradient adjustment of solid-state image detector will be explained based on the 3-D resolution chart shown in FIG. 7.

Figure 11:
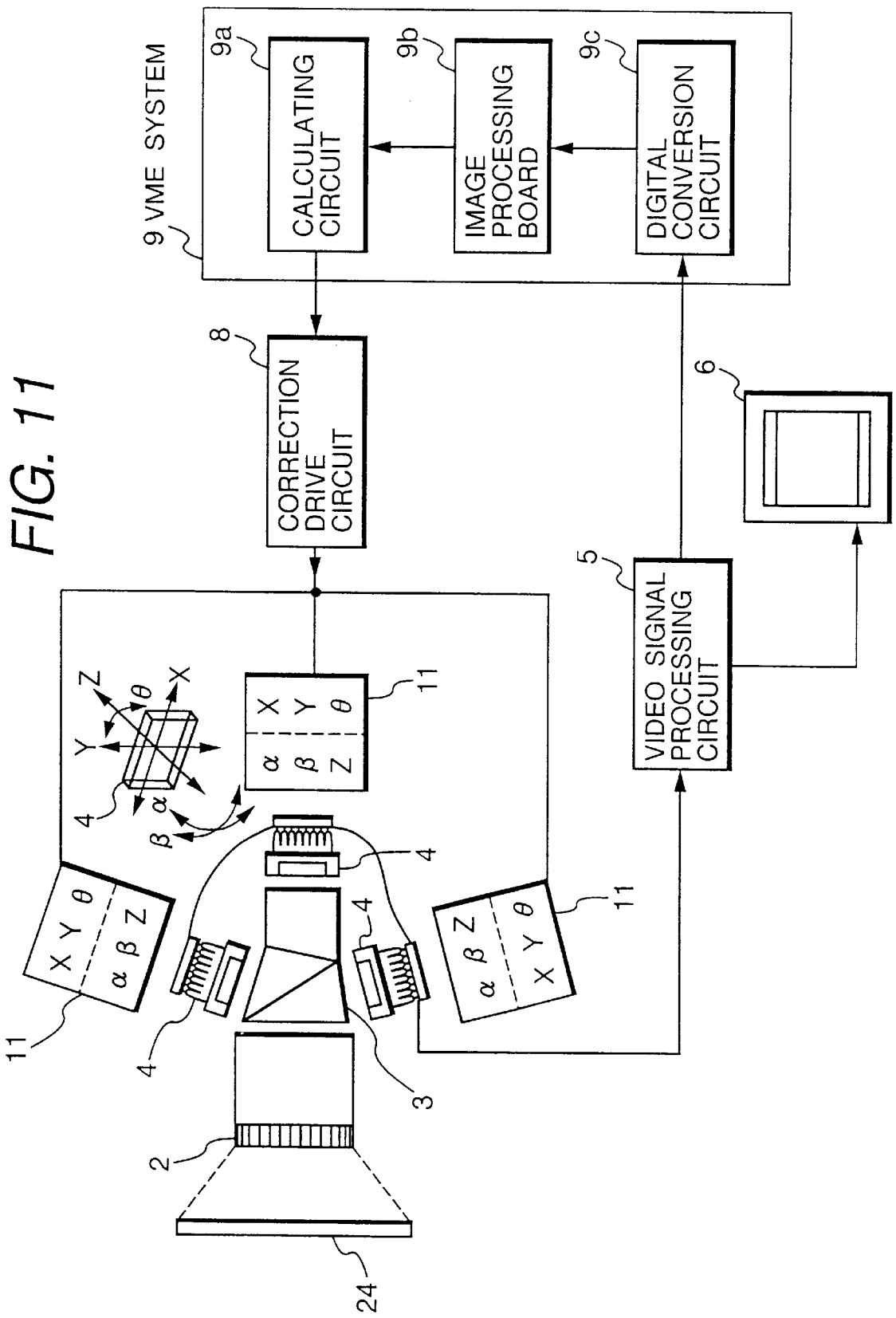
FIG. 11 is a view showing a schematic arrangement of a solid-state image detector positioning system in accordance with the second embodiment of the present invention.

FIG. 11 shows a solid-state image detector positioning apparatus in accordance with the second embodiment of the present invention.

In FIG. 11, 3-D resolution chart 24 shown in FIG. 7 is image formed on solid-state image detector 4 through master lens 2. The video signal, converted into an electric signal through solid-state image detector 4, is entered into TV monitor 6 via video signal processing circuit 5 and also entered into digital conversion circuit 9c of VME system 9 where the video signal is converted into a digital signal, and thereafter the digitized video signal is entered into image processing board 9b where the video signal is written into the frame memory.

In this case, the video image of adjusting pattern of resolution chart 24 displayed on TV monitor 6 is correct alternate black-and-white stripes extending vertically with respect to the screen of TV monitor 6 as shown in FIG. 10.

Figure 12:
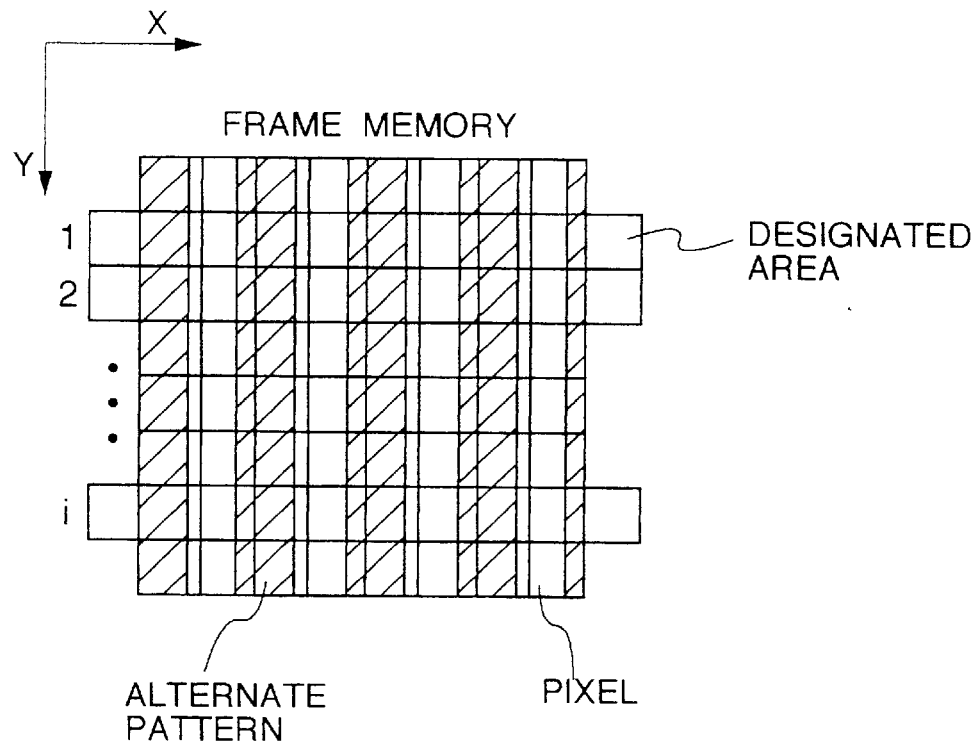
FIG. 12 is a view showing image data of the three-dimensional resolution chart written in the frame memory in accordance with the second embodiment of the present invention.

Accordingly, the image data written into the frame memory of image processing board 9b is alternate black and white stripes extending straight in the Y-axis direction (i.e. normal to the X axis) of the frame memory as shown in FIG. 12.

Figure 13:
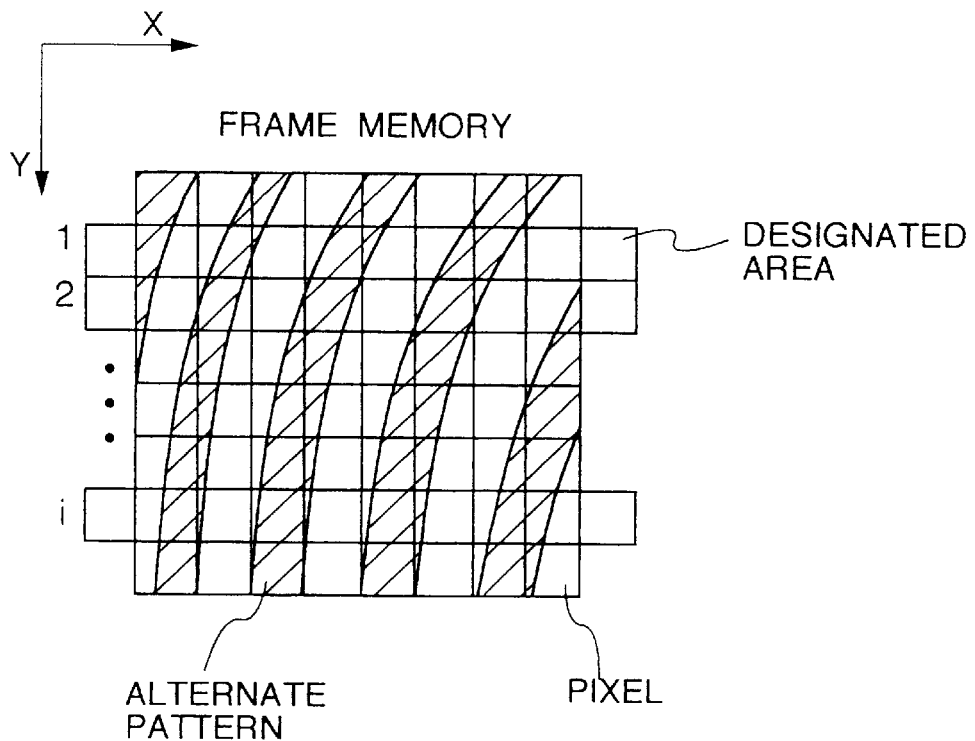
FIG. 13 is a view showing image data of the three-dimensional resolution chart written in the frame memory where the data are subjected to distortion aberration of the lens.

FIG. 13 shows image data subjected to distortion aberration of the lens 2. In other word, provision of 3-D resolution pattern can eliminate such a distortion shown in FIG. 13.

The calculating circuit 9a calculates the contrast integration value by summing up luminance differences of all the adjacent pixels arrayed in the X direction using the image data of adjusting pattern stored in the frame memory shown in FIG. 12.

The contrast distribution is obtained in each of adjusting patterns located at four corners of resolution chart 24, acquiring a total of four focus points of master lens 2. Then, the optimum gradient of solid-state image detector 4 in the image-forming optical system is calculated based on the three-dimensional relationship between resultant plural focus points.

The positioning mechanism 11 adjusts the actual gradient of solid-state image detectors 4 with reference to the calculated optimum gradient.

Regarding the adjustment of back focus, it is needless to say that the second embodiment has the capability of performing the back focus adjustment in the same manner as in the first embodiment.

As apparent from the foregoing description, the second embodiment of the present invention calculates contrast integration value using 3-D resolution chart 24 with adjusting patterns 23 capable of correcting the distortion aberration with respect to master lens 2, obtains the focus point of master lens 2 and the optimum gradient of solid-state image detectors 4, and adjusts the back focus and the gradient of each solid-state image detector 4 by positioning mechanism 11. Hence, it becomes possible to speedily and accurately adjust the position and attitude of each solid-state image detector 4 in an optimum manner in the image-forming optical system.

Furthermore, it is needless to say that the adjusting pattern disclosed in this embodiment can be applied to any other embodiment disclosed in this application so as to correct the distortion aberration in advance with respect to the master lens.

Third Embodiment

Next, a third embodiment of the present invention will be explained.

The third embodiment of the present invention is a solid-state image detector positioning method capable of accurately executing the position adjustment of the solid-state image detector, characterized in that the adjusting pattern is capable of correcting the image magnification difference of each slant surface element on the triangular block of the resolution chart. The image magnification difference is caused due to the difference of distance from said master lens between slant surface elements on the block.

Figure 14:
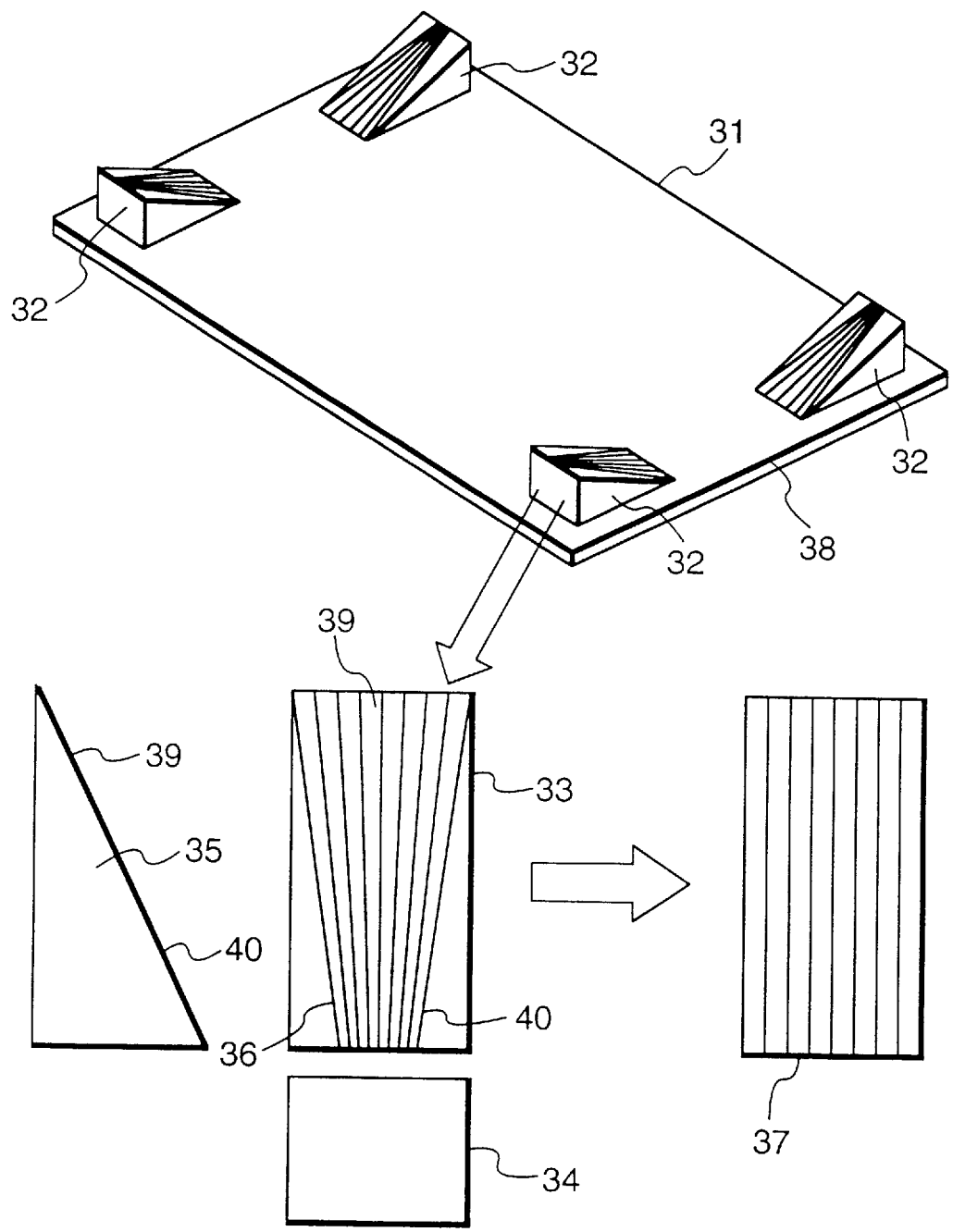
FIG. 14 is a perspective view showing a method of correcting the difference of image magnification using a block provided on a three-dimensional resolution chart used in a third embodiment of the present invention.

FIG. 14 is a view showing a triangular block provided on the resolution chart used in the third embodiment, illustrating a method of correcting the difference of image magnification.

In FIG. 14, the resolution chart 31 comprises four triangular blocks 32 provided at four corners on the upper surface thereof. Reference numeral 33 represents a slant flat surface of triangular block 32, reference numeral 34 represents a bottom of triangular block 32, and reference numeral 35 represents a side of triangular block 32.

Depicted on the slant flat surface 33 is an adjusting pattern 36 which is capable of correcting the image magnification difference of each slant surface element.

Reference numeral 37 represents the image data of adjusting pattern 31 in the frame memory taken through the solid-state image detector 4.

More specifically, the height of slant surface element of triangular block 32 from the reference plane 38 is different between a slope area 39 and a slope area 40. Accordingly, when the resolution chart 31 is image formed by the optical system shown in FIG. 8, the image magnification at slope area 39 is different from the image magnification at slope area 40 in each solid-state image detector 4 due to distance difference of each slope area from master lens 2.

The adjusting pattern 36 of the third embodiment is characterized in that the width between two adjacent stripe lines is varied in accordance with the height from the reference plane 38, i.e. in accordance with the distance from the master lens 2. Hence, the image of the adjusting pattern 36, which is image formed through solid-state image detector 4, is correct stripes arranged at uniform pitches, as indicated by reference numeral 37.

Thus, it becomes possible to calculate the contrast integration value based on the image data of stripes 37 arranged at uniform pitches.

The adjustment of back focus and gradient of each solid-state image detector 4 is carried out in the same manner as in the previous embodiments.

As apparent from the foregoing description, the third embodiment of the present invention calculates the contrast integration value using 3-D resolution chart 31 with adjusting patterns 36 capable of correcting the image magnification, obtains the focus point of master lens 2 and the optimum gradient of solid-state image detectors 4, and adjusts the back focus and the gradient of each solid-state image detector 4 by positioning mechanism 11. Hence, it becomes possible to speedily and accurately adjust the position and attitude of each solid-state image detector 4 in an optimum manner in the image-forming optical system.

Furthermore, it is needless to say that the adjusting pattern disclosed in this embodiment can be applied to any other embodiment disclosed in this application so as to correct the image magnification in advance with respect to the master lens.

Fourth Embodiment

A fourth embodiment of the present invention will be explained hereinafter.

The fourth embodiment of the present invention is a solid-state image detector positioning method capable of accurately executing the position adjustment of the solid-state image detector, characterized in that illuminance irregularity is eliminated by irradiating light from the behind side of the resolution chart which allows the light to penetrate the body thereof.

Figure 15:
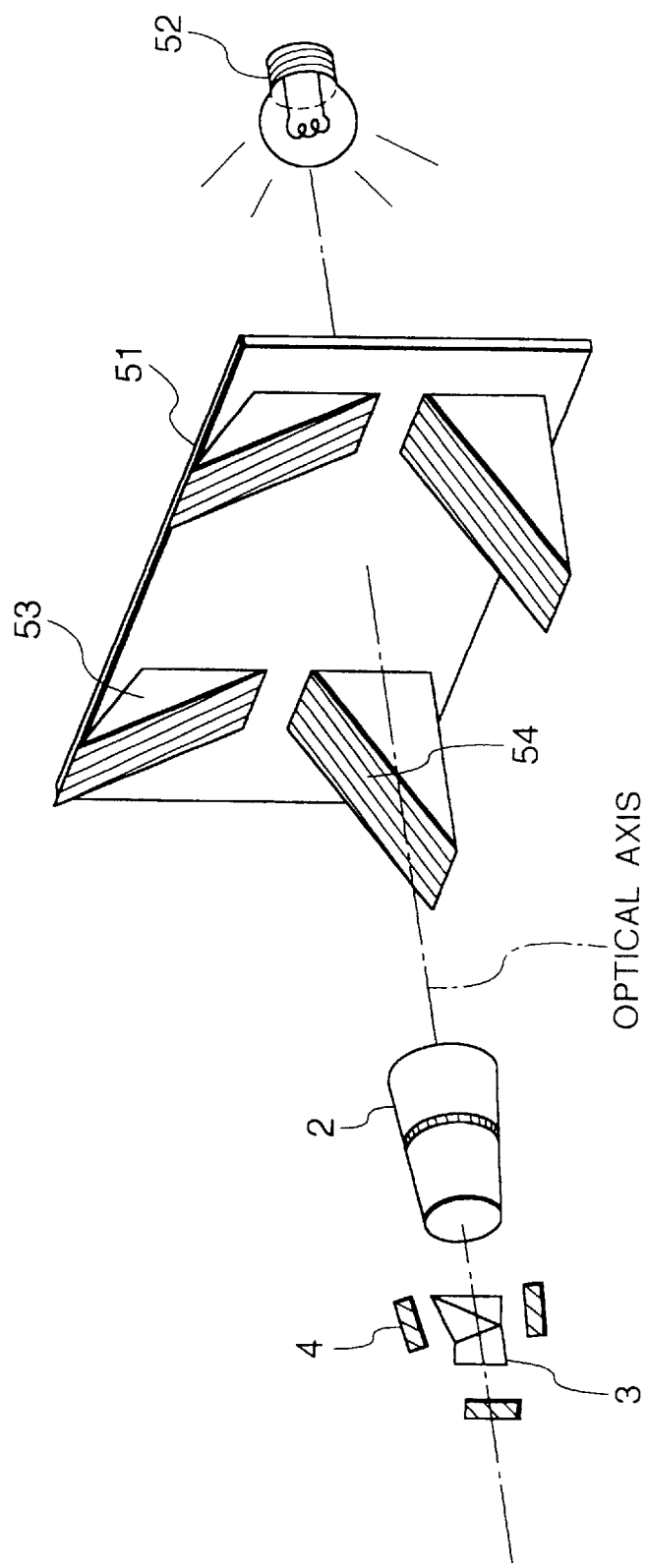
FIG. 15 is a perspective view showing a method for illuminating a three-dimensional resolution chart in accordance with a fourth embodiment of the present invention.

FIG. 15 is a view showing the illumination method of 3-D resolution chart in accordance with the fourth embodiment of the present invention.

In FIG. 15, reference numeral 51 represents the 3-D resolution chart, for example, shown in FIGS. 2, 7 and 14, which is used for detecting the focus point of master lens 2. An illumination light source 52 is disposed behind the 3-D resolution chart 51. The 3-D resolution chart 51 is made of a material allowing light to penetrate the body thereof. The light image passing through this 3-D resolution chart is formed on solid-state image detector 4 through master lens 2 and color separation prism 3.

Reference numeral 53 represents a triangular block provided at each corner of rectangular resolution chart board. Reference numeral 54 represents an adjusting pattern provided on the slant flat surface on the triangular block 53.

Next, an operation of the fourth embodiment of the present invention will be explained with reference to FIG. 15.

The illumination light source 52, as it is disposed just behind the resolution chart 51, can uniformly illuminate the back surface of resolution chart 51. After passing through this 3-D resolution chart 51, the light forms the image of resolution chart 51 on solid-state image detector 4 through master lens 2 and color separation prism 3.

Therefore, by taking in the light image of resolution chart 51 by solid-state image detector, it becomes possible to obtain the image of the resolution chart 54 free from illuminance irregularity.

Based on this image, the focus point of master lens 2 can be detected by finding out the maximum contrast integration value along the slant surface of triangular block 53 on the resolution chart 51. Next, an optimum position where solid-state image detector 4 is disposed is calculated based on thus obtained focus point of master lens 2. Then, solid-state image detector 4 is positioned at the optimum position by positioning mechanism, thereby finally positioning the solid-state image detector at a predetermined position in a given image-forming optical system.

The adjustment of back focus and gradient of each solid-state image detector 4 is carried out in the same manner as in the previous embodiments.

As apparent from the foregoing description, the fourth embodiment of the present invention disposes the illumination light source 52 behind 3-D resolution chart 51 to uniformly illuminate the back surface of resolution chart 51 and allow light to pass through the resolution chart 51, takes in the light image of resolution chart 51 by solid-state image detector 4 to calculate the contrast integration value based on thus obtained image data, calculates the focus point of master lens 2 and the optimum gradient of solid-state image detectors 4, and adjusts the back focus and the gradient of each solid-state image detector 4 by positioning mechanism. Hence, it becomes possible to speedily and accurately adjust the position and attitude of each solid-state image detector 4 in an optimum manner in the image-forming optical system.

Furthermore, it is needless to say that the layout of the illumination light and transparent structure of the resolution chart disclosed in this embodiment can be applied to any other embodiment disclosed in this application so as to correct the illumination irregularity.

Fifth Embodiment

A fifth embodiment of the present invention will be explained hereinafter.

Figure 16:
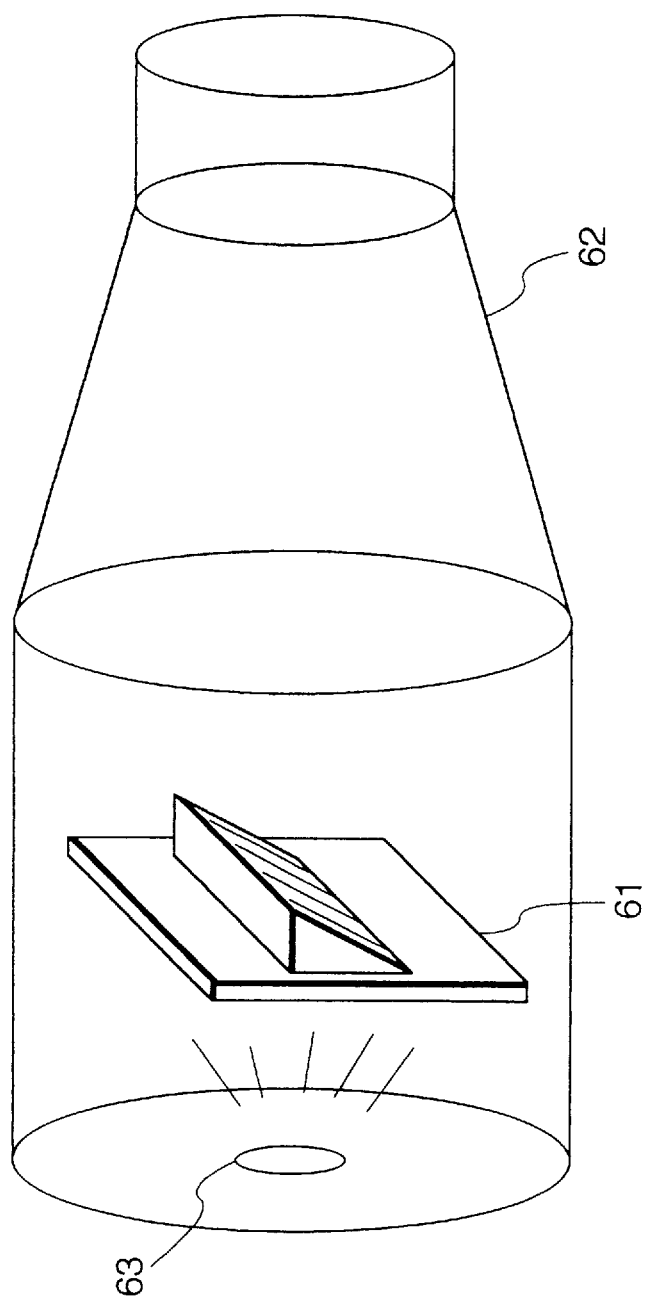
FIG. 16 is a perspective view showing an arrangement of an image-forming optical system in accordance with a fifth embodiment of the present invention.

FIG. 16 shows an arrangement of an image-forming optical system in accordance with the fifth embodiment of the present invention.

In FIG. 16, a 3-D resolution chart 61 has the same function as the resolution chart shown in FIG. 15, although its size is smaller compared with that of FIG. 15. Reference numeral 62 represents a master lens, and reference numeral 63 represents an illumination light source disposed behind the resolution chart 61.

According to the fifth embodiment, small-sized 3-D resolution chart 61 is incorporated into the master lens 62. Thus, it becomes possible to position the solid-state image detector at a desired position in the image-forming optical system even in a narrow space.

Furthermore, it is needless to say that the built-in structure disclosed in this embodiment can be applied to any other embodiment disclosed in this application so as to reduce the size of the system.

Sixth Embodiment

A sixth embodiment of the present invention will be explained hereinafter.

Figure 17:
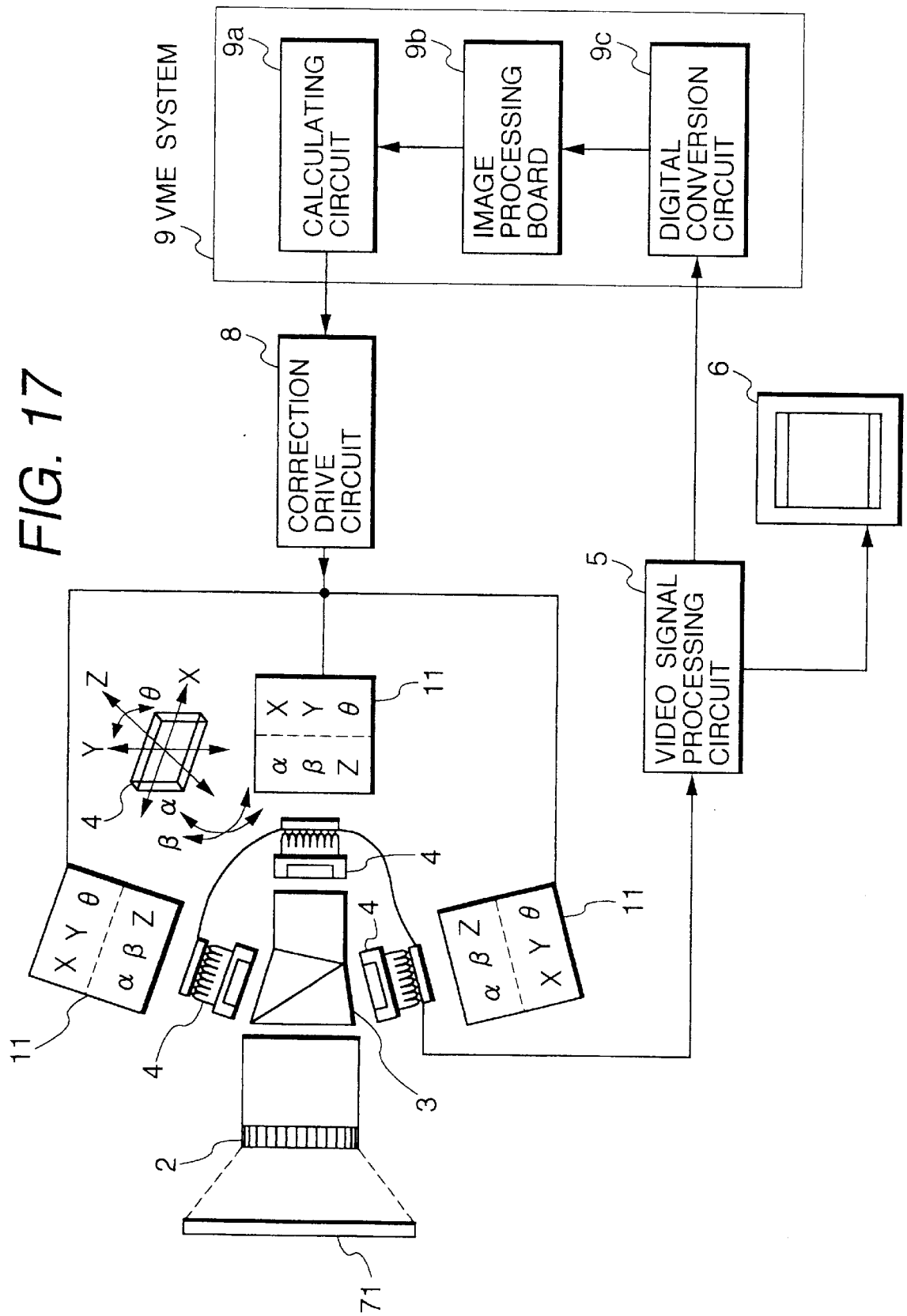
FIG. 17 is a view showing a schematic arrangement of a solid-state image detector positioning system in accordance with a sixth embodiment of the present invention.

FIG. 17 shows a schematic arrangement of a solid-state image detector positioning system in accordance with the sixth embodiment of the present invention.

Figure 18:
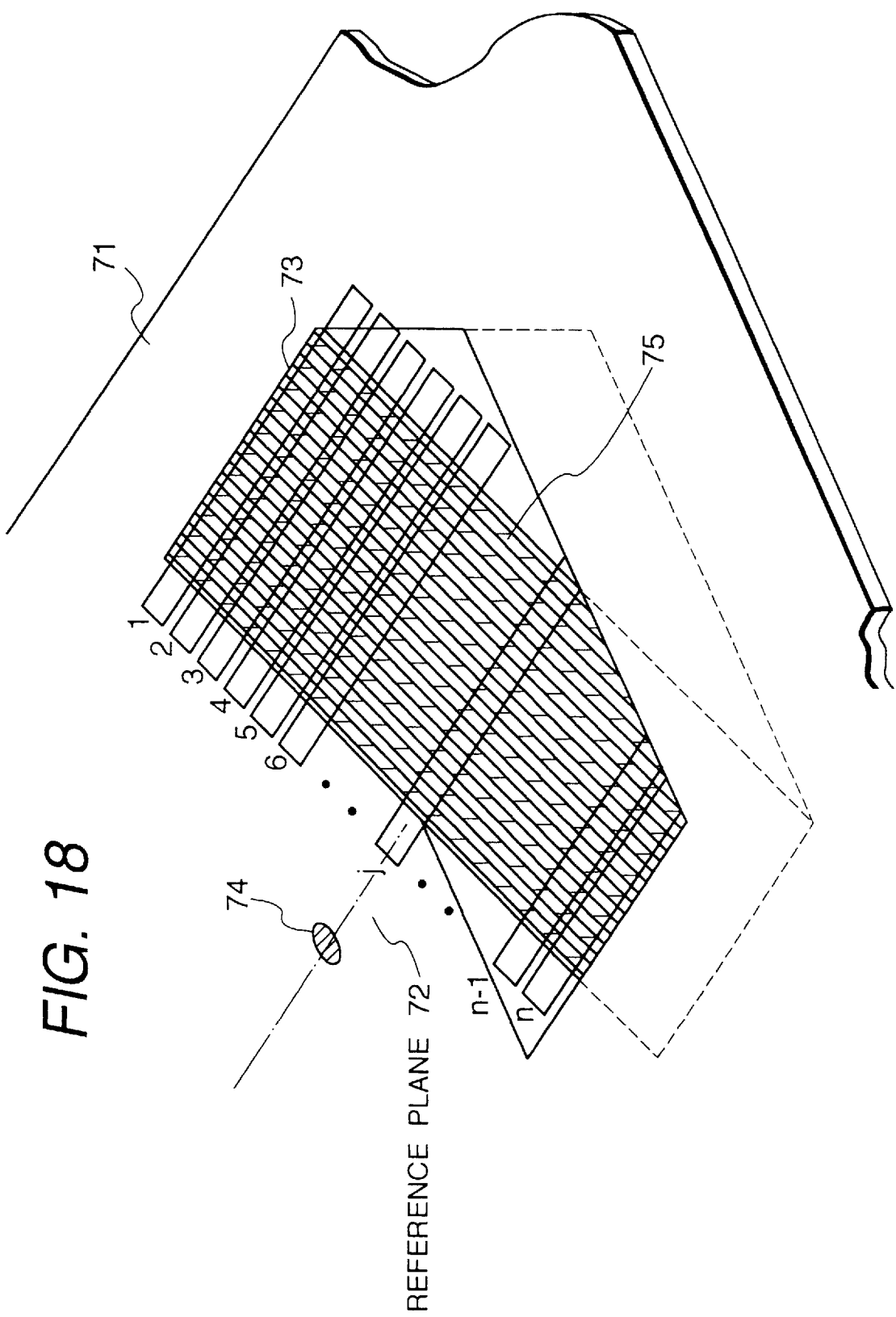
FIG. 18 is a view showing details of a three-dimensional resolution chart in accordance with the sixth embodiment of the present invention.

In FIG. 17, there is provided a 3-D resolution chart 71 which comprises a reference plane 72 on which there is provided a circular pattern 74 used for calculating a center of gravity, and a triangular block 73 having a slant flat surface on which there is provided an adjusting pattern 75, i.e. alternate black-and-white stripes extending along the slope, used for calculating the contrast integration value, as shown in FIG. 18. The combination of circular pattern 74 on reference plane 72 and adjusting pattern 74 on triangular block 73 is provided at each corner of the resolution chart 71.

Next, an operation of the above-described sixth embodiment of the present invention will be explained.

In FIG. 17, light image of resolution chart 71 passes through master lens 2 and enters into color separation prism 3 where the image is separated into three, R, G and B, color components. These, R, G and B, color components are image formed on the solid surface of each solid-state image detector 4, and then converted into electric signals.

The video signal, converted into an electric signal through each solid-state image detector 4, is converted into a digital signal through video signal processing circuit 5 and digital conversion circuit 9c, and thereafter written into the frame memory of image processing board 9b.

Then, the calculating circuit 9a obtains a correction value based on the digital data stored in image processing board 9b. The correction drive circuit 8, through positioning mechanism 11, corrects the deviation between the actual position of solid-state image detector 4 and a calculated position based on the correction value.

Next, details of the position correcting operation will be explained.

Figure 19:
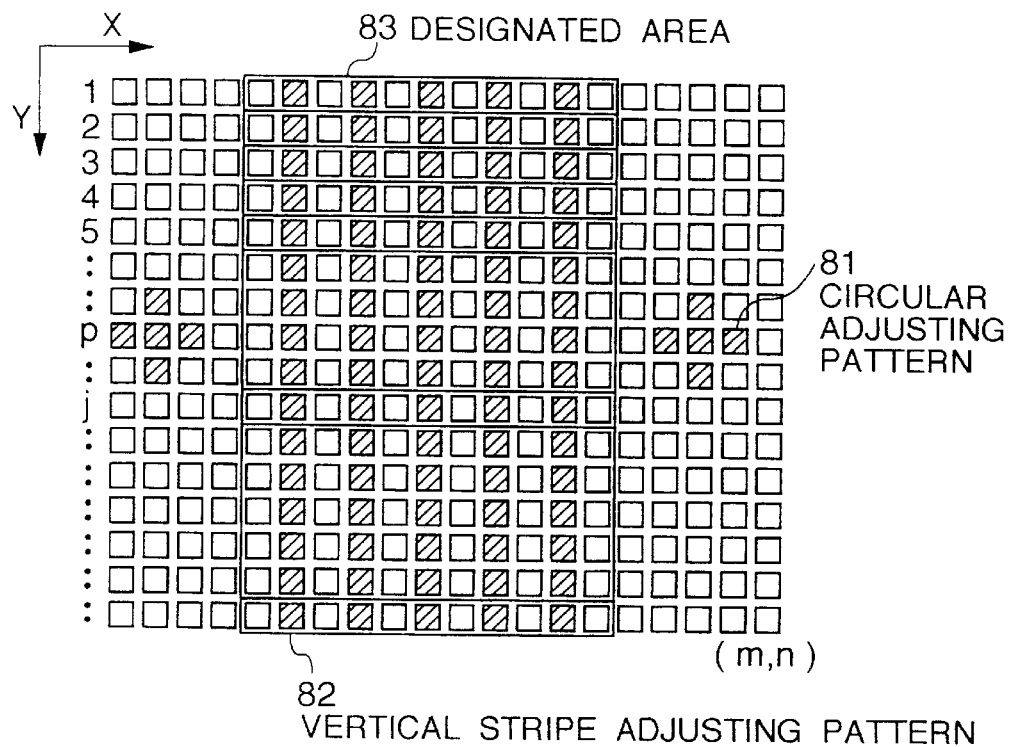
FIG. 19 is a view showing image data of the three-dimensional resolution chart written in the frame memory in accordance with the sixth embodiment of the present invention.

FIG. 19 shows image data of 3-D resolution chart 71 written in the frame memory of image processing board 9b. Reference numeral 81 represents the image of center-of-gravity calculating pattern 74, while reference numeral 82 represents the image of contrast-integration-value calculating pattern 75.

First of all, a designated area 83 is allocated somewhere in the image data of contrast-integration value calculating pattern 75 on the frame memory. The contrast integration value of each line in the designated area is calculated, to find out a specific line having the maximum contrast integration value. Subsequently, referring to the image data of center-of-gravity calculating pattern 74, a position of the center of gravity is obtained in the Y-axis direction.

When the solid-state image detector 4 is positioned at a desired position, i.e. when the focus point of master lens 2 is positioned on the reference plane 72, the position of the specific line in the designated area 83 having the maximum contrast integration value coincides with the Y-axis position of the image of center-of-gravity calculating pattern 74.

Figure 20:
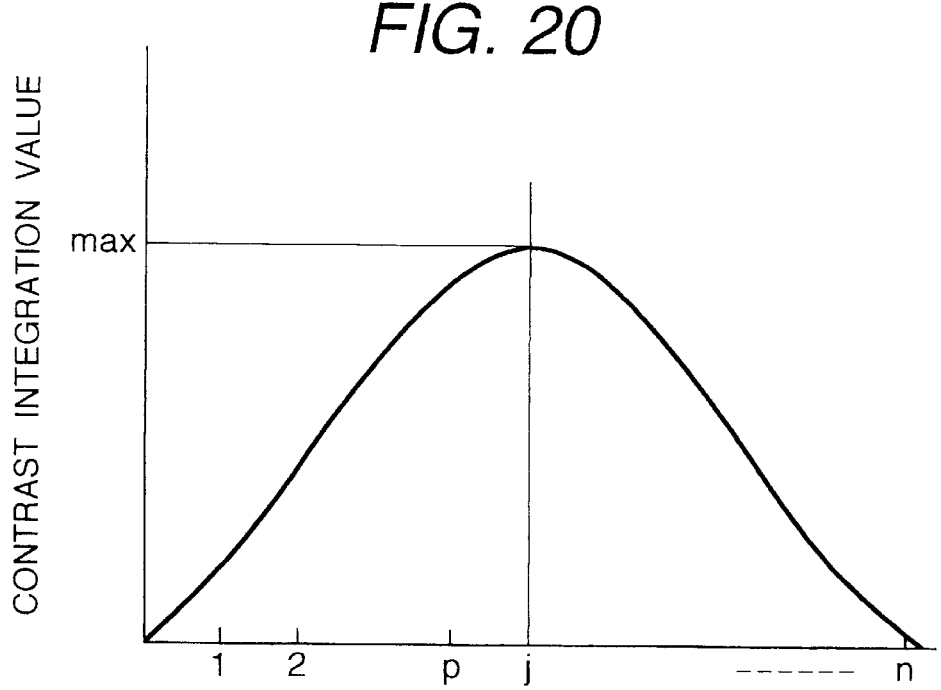
FIG. 20 is a graph showing the characteristics of contrast integration value in accordance with the sixth embodiment of the present invention, where the solid-state image detector is offset from the predetermined position in the image-forming optical system and is positioned closely to a color separation prism.

If the solid-state image detector 4 is offset from the desired position in the image-forming optical system toward color separation prism 3, the relationship between the line j and center-of-gravity position p will be obtained as shown in FIG. 20, where line j represents a specific line in the designated area 83 having the maximum contrast integration value while center-of-gravity position p represents the Y-axis position of the image of center-of-gravity calculating pattern 74.

The above-described processing is carried out in each of R, G and B solid-state image detectors 4. And then, correction drive circuit 7 controls the positioning mechanism 11 to equalize the position of the maximum contrast integration line with the position of center-of-gravity calculating pattern 74 in the Y direction. Thus, each solid-state image detector 4 can be positioned at a desired position in the given image-forming optical system.

In this manner, the sixth embodiment of the present invention provides resolution chart 71 having reference plane 72 on which center-of-gravity circular pattern 74 is provided and a triangular block 73 with contrast-integration-value calculating pattern 75 provided on the slant flat surface thereof, takes in the image of resolution chart 71 by solid-state image detector 4 and displays the image on TV monitor 6, calculates the position of maximum contrast integration based on the image of contrast-integration-value calculating pattern 75, calculates the Y-axis direction position of the center of gravity based on the image of center-of-gravity calculating pattern 74, and calculates the focus point of master lens 2 and an optimum gradient of each solid-state image detector 4 by comparing the positional relation between the position of maximum contrast integration value and the Y-axis direction position of the center of gravity.

Hence, the position adjustment can be executed by visually confirming the positional relationship between each solid-state image detector 4 and the focus point of master lens 2. Accordingly, it becomes possible to speedily and accurately adjust the position and attitude of each solid-state image detector 4 in an optimum manner in the given image-forming optical system.

Although the above-described sixth embodiment uses the triangular block with a slant surface on which contrast-integration-value calculating pattern of alternate black-and-white stripes is depicted, and uses a circle pattern for the center-of-gravity calculating pattern, it is needless to say that the triangular block can be replaced by any other block having a surface slanting in the depth (or height) direction with respect to the reference plane (i.e. upper surface) of the resolution chart. Furthermore, any other contrast-integration-value calculating pattern will be used if it allows the comparison between contrast integration values. Yet further, any other center-of-gravity calculating pattern will be used if it allows the measurement of the center of gravity in the Y-axis direction.

Seventh Embodiment

Hereinafter, a seventh embodiment of the present invention will be explained.

The seventh embodiment of the present invention is a solid-state image detector positioning method capable of accurately executing the position adjustment of the solid-state image detector, characterized in that the focus point of master lens is visualized.

Figure 21:
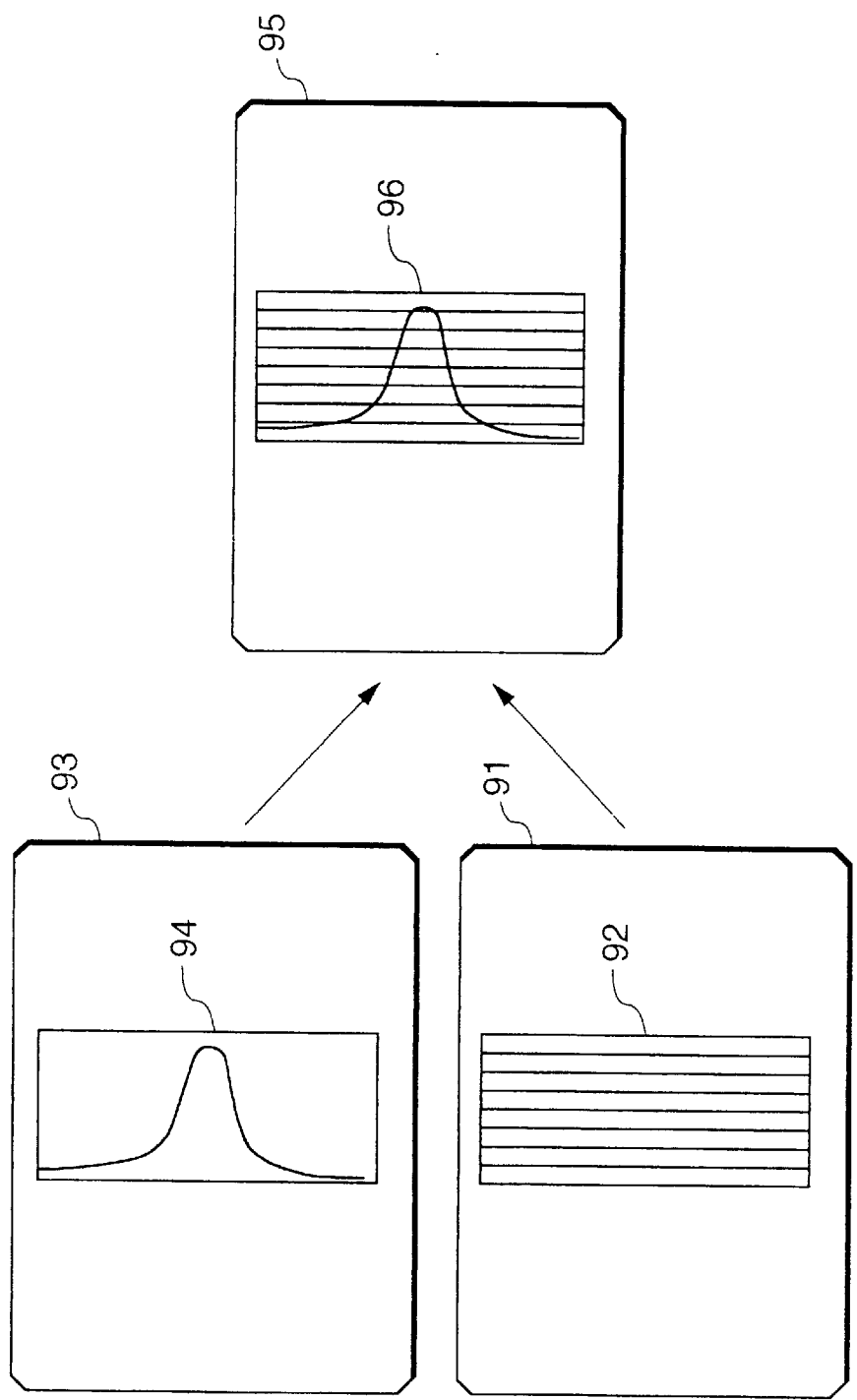
FIG. 21 is a view illustrating a method for visualizing the focus point of the master lens in accordance with a seventh embodiment of the present invention.

FIG. 21 is a view showing the method of visualizing the focus point of master lens in accordance with the seventh embodiment.

In FIG. 21, reference numeral 91 represents a screen displaying the image 92 of an adjusting pattern, which is depicted on the slant surface of triangular block on the resolution chart, taken in by the solid-state image detector, written into the frame memory, and finally displayed on the TV monitor.

Reference numeral 93 represents a screen displaying, as a monitor display, the image 94 of a contrast-integration-value curve created on an over lay (memory) based on the contrast integration values which are calculated by providing the designated areas as shown in FIG. 4, and calculating the contrast integration value in the X-axis direction in each designated area.

Reference numeral 95 represents a screen which displays a composite image 96 of the adjusting pattern image 92 and contrast-integration-value curve image 94 which are superimposed with each other.

Next, an operation of the seventh embodiment of the present invention will be explained.

The adjusting pattern of the resolution chart is image formed on the solid-state image detector and its video data are written into the frame memory. The contrast integration values are calculated based on the adjusting pattern image 92, and then the image of the contrast-integration-value curve is created based on these values. Then, the focus-point-recognition image 96 is created by superimposing both the adjusting pattern image 92 and the contrast-integration-value curve image 94 on the TV monitor.

Subsequently, based on thus obtained focus-point-recognition image 96, the focus point of the master lens and the gradient of each solid-state image detector are calculated in a simple manner. In other words, the adjustment of the focus point of the master lens and the gradient of each solid-state image detector can be performed easily (mostly at one time) by actuating each positioning mechanism based on the visible focus-point-recognition image 96 displayed on the TV monitor, without repetitively sliding each solid-state image detector in the optical axis direction.

In this manner, the seventh embodiment of the present invention takes in the image of the adjusting pattern provided on the 3-D resolution chart, calculates the contrast integration values based on the adjusting pattern image, creates the image of the contrast-integration-value curve on the over lay (memory) based on the contrast integration values, displays on the TV monitor the focus-point-recognition image 96 which is a composite or superimposed image of the adjusting pattern image 92 and the contrast-integration-value curve image 94, and finally allowing to adjust the back focus and the gradient of each solid-state image detector to optimum positions or values in the given image-forming optical system by a positioning mechanism based on the visible focus-point-recognition image 96 displayed on the TV monitor.

Thus, the seventh embodiment makes it possible to visually recognize the focus point of the master lens and to speedily and easily move or shift each solid-state image detector to the optimum position in the given image-forming optical system.

Eighth Embodiment

Next, an eighth embodiment of the present invention will be explained.

Figure 22:
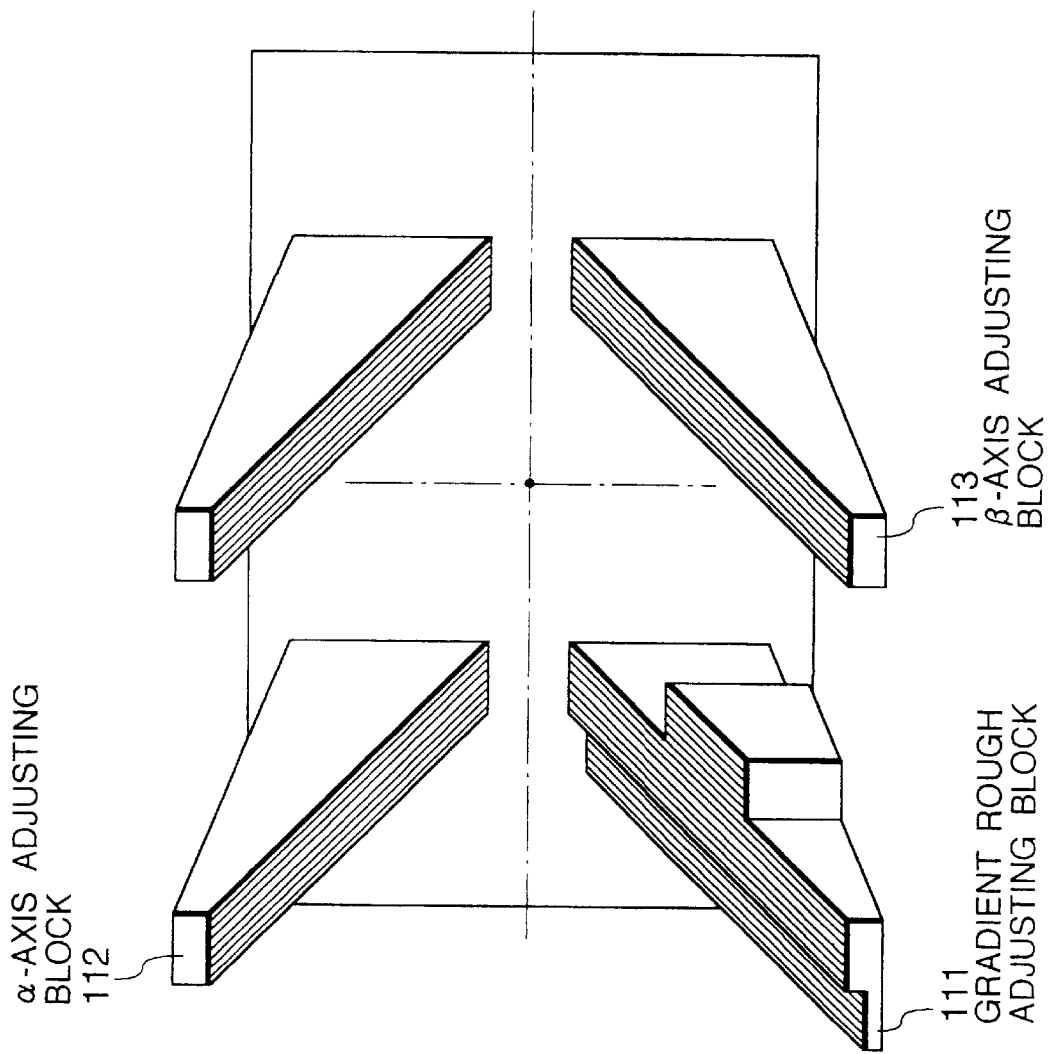
FIG. 22 is a view showing the configuration of a three-dimensional resolution chart in accordance with an eighth embodiment of the present invention.

FIG. 22 shows an arrangement of a 3-D resolution chart in accordance with the eighth embodiment.

In FIG. 22, a gradient-rough-adjusting triangular block 111 is provided to perform a rough adjustment of the gradient of each solid-state image detector in the given image-forming optical system. The gradient-rough-adjusting triangular block 111 has the capability of measuring a different or supplementary area in addition to an ordinary measuring area in the measurement of the focus point of the master lens.

An operation of the eighth embodiment will be explained. In the gradient adjustment of each solid-state image detector in the image-forming optical system, it is definitely necessary to adjust the gradient of each solid-state image detector so that the pixel face of each solid-state image detector becomes parallel to the reference plane of the resolution chart.

When the image of the resolution chart is formed on the solid-state image detector through the master lens, the focus point of the master lens will be just fitted at everywhere on the reference plane of the resolution chart if the pixel face of each solid-state image detector is parallel to the reference plane of the resolution chart. In other words, when the pixel face of each solid-state image detector is not parallel (i.e. inclined) to the reference plane of the resolution chart, the focus point of the master lens will be offset from the reference plane of the resolution chart.

If the inclination of a concerned solid-state image detector is excessively large, the focus point of the master will be greatly deviated from the reference plane. Thus, there is the possibility that it may fail to detect all the triangular blocks disposed on four corners of the resolution chart.

More specifically, in the position adjustment of each solid-state image detector, excessively large inclination of the solid-state image detector will result in the failure in calculating the three-dimensional relationship among plural focus points. Thus, there is the possibility that the gradient of each solid-state image detector cannot be calculated in the given image-forming optical system.

To solve this problem, the eighth embodiment provides the gradient rough adjusting triangular block at one corner of the resolution chart. This gradient rough adjusting triangular block has a configuration capable of measuring a different or additional area in addition to an ordinary measuring area in the measurement of the focus point of the master lens as shown in FIG. 22.

Figure 23:
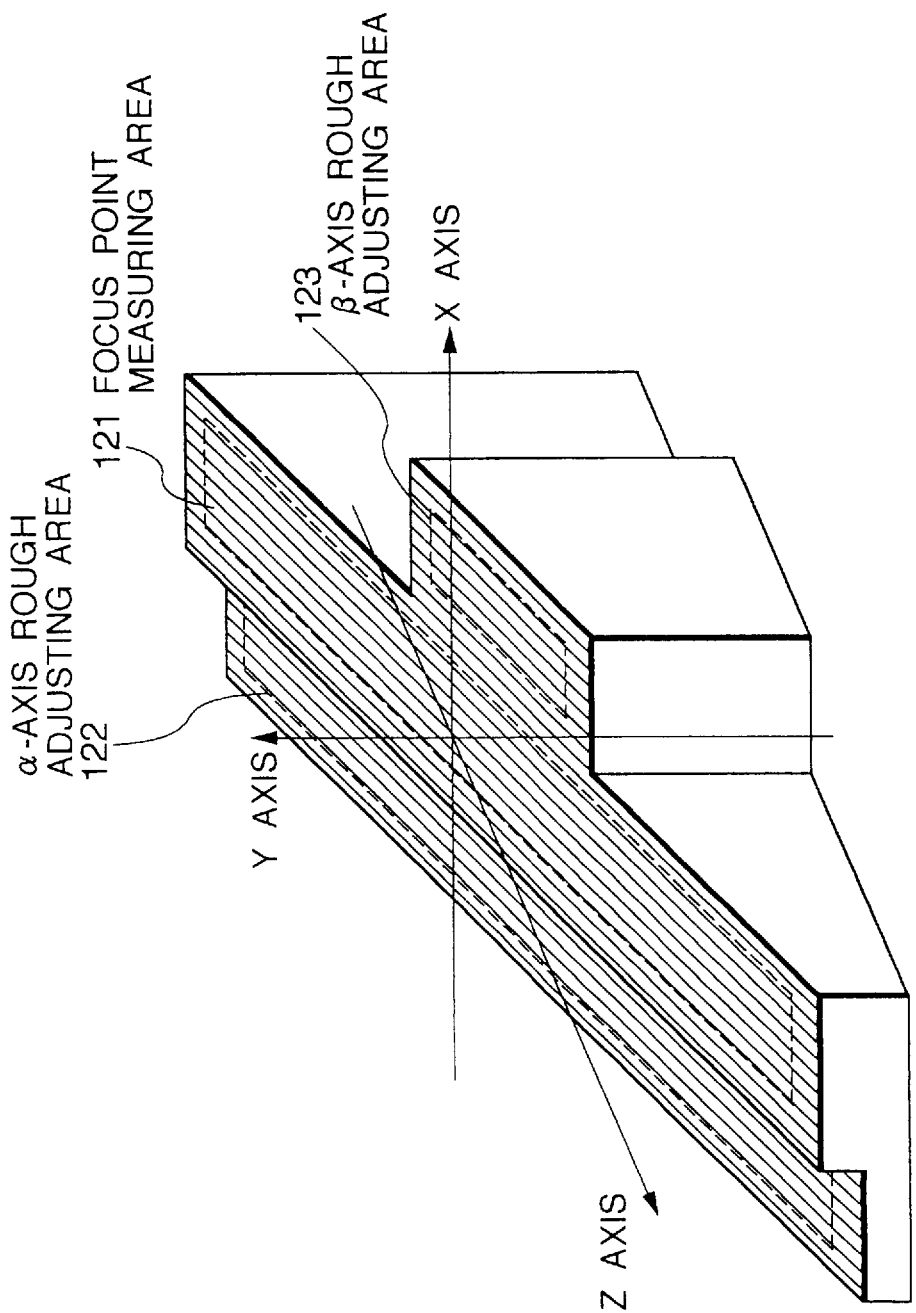
FIG. 23 is an enlarged perspective view showing details of the three-dimensional resolution chart in accordance with the eighth embodiment of the present invention.
Figure 24:
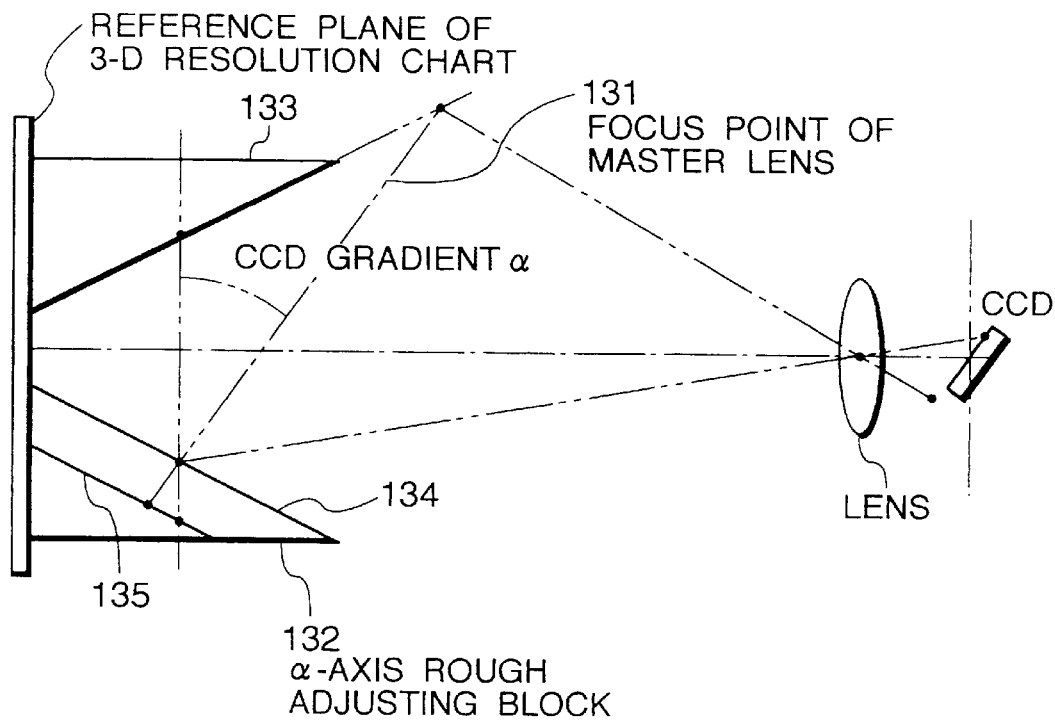
FIG. 24 is a view illustrating an α axis adjustment in accordance with the eighth embodiment of the present invention.

When the $\alpha$-axis gradient of a concerned solid-state image detector is large, the focus point of the master lens may be largely deviated from the $\alpha$-axis adjusting triangular block 112. In such a case, the focus point of the master lens appears on the image plane 131 shown in FIG. 24. If the focus point of the master lens is focused at the center of focus-point-measuring area 121, the focus point of the master lens may be offset out of the surface of $\alpha$-axis adjusting triangular block 133 as shown in FIG. 24. However, it will be possible to detect the focus point of the master lens on the surface of $\alpha$-axis rough gradient adjusting area 122, since the $\alpha$-axis rough gradient adjusting area 122 is stepped down in parallel with the surface of the focus-point-measuring area 121 as shown in FIG. 23.

Figure 25:
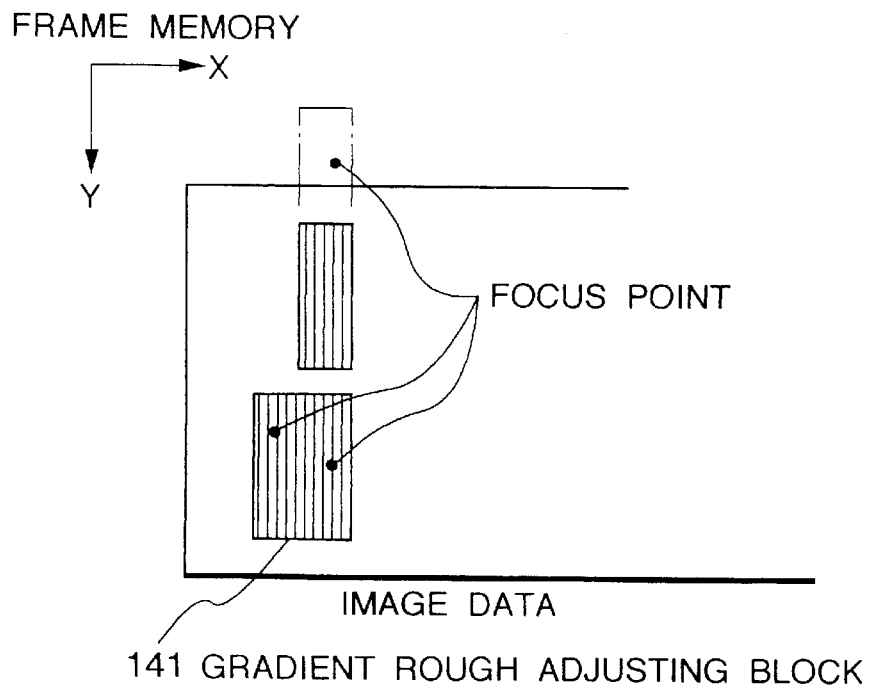
FIG. 25 is a view illustrating the α axis adjustment in accordance with the eighth embodiment of the present invention.

Thus, as shown in FIG. 25, referring to two focus points of the master lens detected on the gradient rough adjusting triangular block 141, the $\alpha$-axis gradient of the solid-state image detector is adjusted in such a manner these two focus points detected on two stepped slopes are equalized in the height from the optical axis.

Accordingly, in FIG. 24, the distance from the focus point of the master lens focused in the vicinity of the center of focus-point-measuring area 134 to the reference plane can be equalized to the distance from the focus point of the master lens detected on the $\alpha$-axis rough adjusting area 134, roughly positioning the pixel face of the solid-state image detector in parallel with the reference plane of the resolution chart.

After finishing the rough adjustment of $\alpha$-axis gradient, it is recommendable to perform a fine adjustment using the focus points formed on the surfaces of $\beta$-axis adjusting block 112 and the block 111.

The adjustment of $\beta$-axis gradient is performed in the same manner as $\alpha$-axis gradient adjustment.

Figure 26:
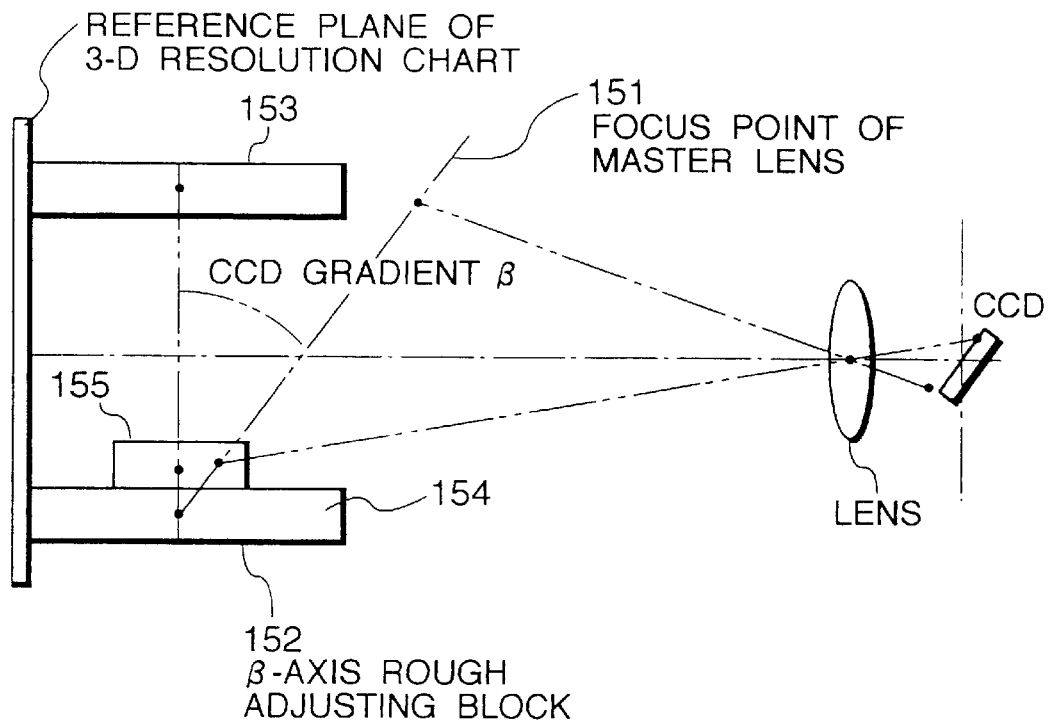
FIG. 26 is a view illustrating a β axis adjustment in accordance with the eighth embodiment of the present invention.

When the $\beta$-axis gradient of a concerned solid-state image detector is large, the focus point of the master lens may be offset out of the surface of the $\beta$-axis adjusting triangular block 113 shown in FIG. 22. In such a case, the focus point of the master lens will appear on the image plane 151 as shown in FIG. 26. If the focus point of the master lens is focused at the center of focus-point-measuring area 121, the focus point of the master lens may be offset out of the surface of β-axis adjusting triangular block 153 as shown in FIG. 26. However, it will be possible to detect the focus point of the master lens on the surface of β-axis rough gradient adjusting area 123, since the β-axis rough gradient adjusting area 123 is provided inward but on the same plane as the surface of the focus-point-measuring area 121 as shown in FIG. 23.

Figure 27:
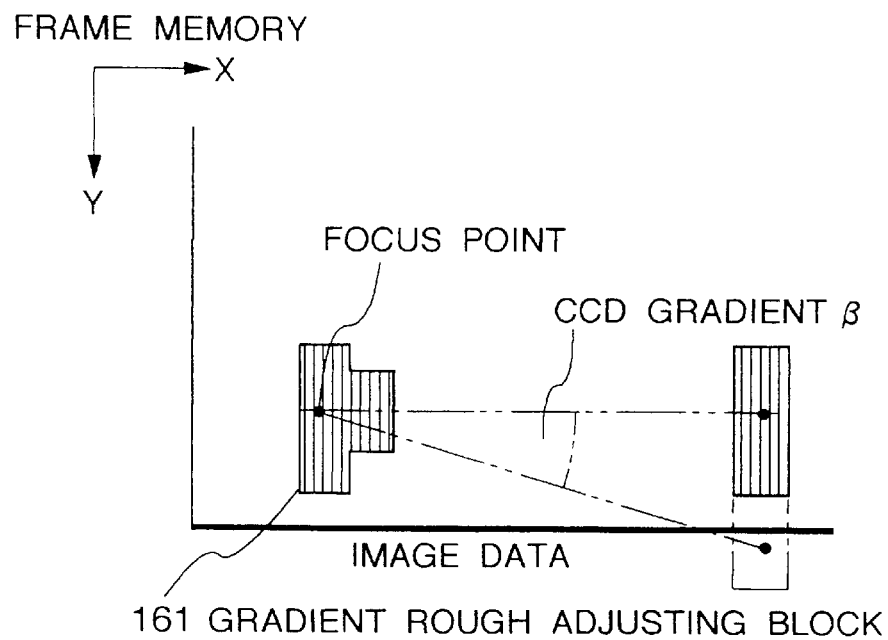
FIG. 27 is a view illustrating the β axis adjustment in accordance with the eighth embodiment of the present invention.

Thus, as shown in FIG. 27, referring to two focus points of the master lens detected on the gradient rough adjusting triangular block 161, the β-axis gradient of the solid-state image detector is adjusted in such a manner that these two focus points are equalized in their positions with respect to the Y axis of the frame memory in the image processing device.

Accordingly, in FIG. 26, the distance from the focus point of the master lens focused in the vicinity of the center of focus-point-measuring area 154 to the reference plane can be equalized to the distance from the focus point of the master lens detected on the β-axis rough adjusting area 155, roughly positioning the pixel face of the solid-state image detector in parallel with the reference plane of the resolution chart.

After finishing the rough adjustment of β-axis gradient, it is recommendable to perform a fine adjustment using the focus points formed on the surfaces of β-axis adjusting block 113 and the block 111.

In this manner, the eighth embodiment of the present invention can be effectively employed in the positioning operation of a solid-state image detector based on the image signal taken by the solid-state image detector even when the focus point of the master lens cannot be detected on all the triangular blocks located at four corners of the resolution chart due to an excessively large gradient of the solid-state image detector.

That is, the eighth embodiment provides the gradient rough adjusting triangular block configured in the shape capable of measuring a predetermined different or supplementary area in addition to the ordinary measuring area in the measurement of the focus point of the master lens as shown in FIG. 23, so that the focus point of the master lens can be surely detected on each of plural triangular blocks. Accordingly, it becomes possible to detect or calculate the gradient of each solid-state image detector in a wide range of the given image-forming optical system. Furthermore, by performing the fine adjustment after finishing the rough adjustment, the accuracy in the gradient adjustment of each solid-state image detector can be assured.

Ninth Embodiment

A ninth embodiment of the present invention will be explained with reference to FIG. 28.

Figure 28:
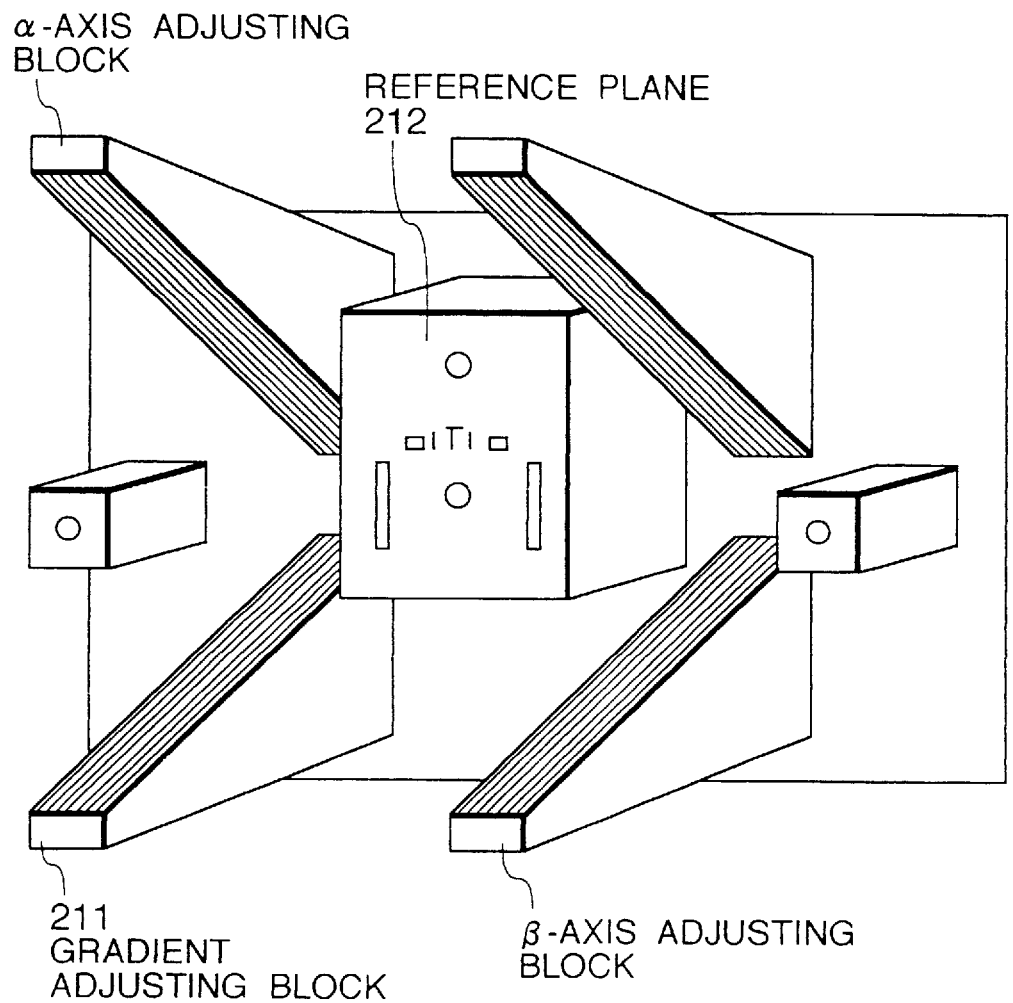
FIG. 28 is a view showing the configuration of a three-dimensional resolution chart in accordance with a ninth embodiment of the present invention.

FIG. 28 shows the configuration of a 3-D resolution chart in accordance with the ninth embodiment of the present invention, which is used to detect the gradient of each solid-state image detector in the given image-forming optical system and position deviation of the back focus after a 3-plate CCD block is adhered. In FIG. 28, reference numeral 211 represents a triangular block disposed at four corners of the resolution chart 211 for detecting the gradient of the solid-state image detector. The gradient of the solid-state image detector is calculated based on the three-dimensional relationship between plural focus points of the master lens detected on the slopes of four triangular blocks. The three-dimensional position of the focus point of the master lens can be known from the (X, Y) coordinate values and the height from the reference plane 212 thereof which are obtained from the image data of the solid-state image detector.

Next, an operation of the ninth embodiment will be explained.

After the solid-state image detector positioned at the optimum position in the image-forming optical system based on the image signal of the resolution chart taken by the solid-state image detector, the solid-state image detector is bonded to an optical block (prism) through a wedge block by means of UV adhesive material.

However, after finishing this adhesion operation, there is the possibility that the solid-state image detector may be dislocated from the optimum position due to thermal expansion and contraction stress occurring when the adhesive material is hardened.

Regarding X-, Y- and θ-directional dislocations of the solid-state image detector can be obtained even by the conventional 2-D resolution chart, using the image signal of the resolution chart taken by the solid-state image detector.

However, the conventional 2-D resolution chart is no longer useful to detect α-, β- and Z-directional dislocations (i.e. gradient and back focus) of the solid-state image detector, because the conventional adjustment based on the 2-D resolution chart can be performed only when the solid-state image detector is movable in the optical-axis direction. More specifically, this conventional adjustment basically relies on the repetitive shift adjustment of the solid-state image detector in the optical direction to find out the position of maximum contrast integration value as described previously. Thus, the conventional adjustment cannot be employed for the detection of the α-, β- and Z-directional dislocations (i.e. gradient and back focus) of the stationary solid-state image detector which is already bonded by adhesive material.

To solve such problems, the ninth embodiment of the present invention uses the 3-D resolution chart shown in FIG. 28. After the adhesive material (bond material) is hardened, the adjusting pattern depicted on the slope of each rectangular block on the resolution chart is image formed on the solid-state image detector through the master lens. Then, the focus point of the master lens is detected by obtaining the position of maximum contrast integration value based on the image data of the adjusting pattern.

Subsequently, the optimum position of the solid-state image detector, i.e. α-, β- and Z-directional values, can be calculated based on the obtained focus points.

If the solid-state image detector is subjected to any undesirable gradient after hardening of adhesive material, plural focus points will be focused at different heights from the reference plane 212 on respective slopes of triangular blocks 211 disposed at four corners of the resolution chart.

Regarding the back focus, any deviation caused after hardening of adhesive material can be measured by detecting the focus points of the master lens formed on the triangular blocks 211 located at four corners of the resolution chart.

In this manner, the ninth embodiment of the present invention takes in the image of the 3-D resolution chart by the solid-state image detector through the master lens after hardening the adhesive material bonding the solid-state image detector at the optimum position in the given image-forming optical system, and calculates the gradient and the back focus of the solid-state image detector based on the obtained image data without shifting the solid-state image detector in the back-and-forth direction of the optical axis.

Hence, it becomes possible to detect the positional deviations in each of α, β and Z directions even after the solid-state image detector is firmly fixed by adhesive material.

As apparent from the above-described first embodiment of the present invention, the present invention takes in the image of the 3-D resolution chart by three solid-state image detectors through the master lens, calculates the contrast integration value based on the camera image of the adjusting patterns on the slant surfaces of triangular blocks located at four corners of the resolution chart, and identifies the focus point of the master lens by finding out the maximum contrast integration point in relation to the deviation from the reference plane of the resolution chart, without requiring repetitive shift adjustment of each solid-state image detector in the back-and-forth direction of the optical axis.

Furthermore, the present invention detects the focus point of the master lens at each of four triangular blocks of the 3-D resolution chart based on the camera image of the adjusting pattern provided on the slant surface thereof, calculates the optimum gradient of each solid-state image detector based on the three-dimensional relationship between four maximum contrast points on the triangular blocks located at four corners of the 3-D resolution chart each representing the focus point of the master lens, adjusts the back focus and the actual gradient of each solid-state image detector by the positioning mechanism. Thus, it becomes possible to speedily positioning each solid-state image detector at the optimum position in the image-forming optical system.

As apparent from the above-described second embodiment, the present invention calculates contrast integration value using the 3-D resolution chart with adjusting patterns capable of correcting the distortion aberration with respect to the master lens, obtains the focus point of the master lens and the optimum gradient of solid-state image detectors, and adjusts the back focus and the gradient of each solid-state image detector by the positioning mechanism. Hence, it becomes possible to speedily and accurately adjust the position and attitude of each solid-state image detector in an optimum manner in the image-forming optical system.

As apparent from the above-described third embodiment, the present invention calculates the contrast integration value using the 3-D resolution chart with adjusting patterns capable of correcting the image magnification, obtains the focus point of the master lens and the optimum gradient of solid-state image detectors, and adjusts the back focus and the gradient of each solid-state image detector by the positioning mechanism. Hence, it becomes possible to speedily and accurately adjust the position and attitude of each solid-state image detector in an optimum manner in the image-forming optical system.

As apparent from the above-described fourth embodiment, the present invention disposes the illumination light source behind the 3-D resolution chart to uniformly illuminate the back surface of the resolution chart and allow light to pass through the body of the resolution chart, takes in the light image of the resolution chart by the solid-state image detector to calculate the contrast integration value based on thus obtained image data, calculates the focus point of the master lens and the optimum gradient of solid-state image detectors, and adjusts the back focus and the gradient of each solid-state image detector by the positioning mechanism. Hence, it becomes possible to speedily and accurately adjust the position and attitude of each solid-state image detector in an optimum manner in the image-forming optical system.

As apparent from the above-described fifth embodiment, the present invention allows the small-sized 3-D resolution chart to be incorporated into the master lens. Thus, it becomes possible to position the solid-state image detector at a desired position in the image-forming optical system even in a narrow space.

As apparent from the above-described sixth embodiment, the present invention provides the resolution chart having the reference plane on which the center-of-gravity circular pattern is provided and a triangular block with contrast-integration-value calculating pattern provided on the slant flat surface thereof, takes in the image of the resolution chart by the solid-state image detector and displays the image on the TV monitor, calculates the position of maximum contrast integration value based on the image of the contrast-integration-value calculating pattern, calculates the Y-axis direction position of the center of gravity based on the image of the center-of-gravity calculating pattern, and calculates the focus point of the master lens and an optimum gradient of each solid-state image detector by comparing the positional relation between the position of maximum contrast integration value and the Y-axis direction position of the center of gravity. Hence, the position adjustment can be executed by visually confirming the positional relationship between each solid-state image detector and the focus point of master lens. Accordingly, it becomes possible to speedily and accurately adjust the position and attitude of each solid-state image detector in an optimum manner in the given image-forming optical system.

As apparent from the above-described seventh embodiment, the present invention takes in the image of the adjusting pattern provided on the 3-D resolution chart, calculates the contrast integration values based on the adjusting pattern image, creates the image of the contrast-integration-value curve on the over lay (memory) based on the contrast integration values, displays on the TV monitor the focus-point-recognition image which is a composite or superimposed image of the adjusting pattern image and the contrast-integration-value curve image, and finally allowing to adjust the back focus and the gradient of each solid-state image detector to optimum positions or values in the given image-forming optical system by the positioning mechanism based on the visible focus-point-recognition image displayed on the TV monitor. Thus, the present invention makes it possible to visually recognize the focus point of the master lens and to speedily and easily move or shift each solid-state image detector to the optimum position in the given image-forming optical system.

As apparent from the above-described eighth embodiment, the present invention can be effectively employed in the positioning operation of a solid-state image detector based on the image signal taken by the solid-state image detector even when the focus point of the master lens cannot be detected on all the triangular blocks located at four corners of the resolution chart due to an excessively large gradient of the solid-state image detector. That is, the present invention provides the gradient rough adjusting triangular block configured in the shape capable of measuring a predetermined different or supplementary area in addition to the ordinary measuring area in the measurement of the focus point of the master lens, so that the focus point of the master lens can be surely detected on each of plural triangular blocks. Accordingly, it becomes possible to detect or calculate the gradient of each solid-state image detector in a wide range of the given image-forming optical system. Furthermore, by performing the fine adjustment after finishing the rough adjustment, the accuracy in the gradient adjustment of each solid-state image detector can be assured.

As apparent from the above-described ninth embodiment, the present invention takes in the image of the 3-D resolution chart by the solid-state image detector through the master lens after hardening the adhesive material bonding the solid-state image detector at the optimum position in the given image-forming optical system, and calculates the gradient and the back focus of the solid-state image detector based on the obtained image data without shifting the solid-state image detector in the back-and-forth direction of the optical axis. Hence, it becomes possible to detect the positional deviations in the directions of the back focus and the gradient even after the solid-state image detector is firmly fixed by adhesive material.

This invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A method for adjusting the position of a solid-state image detector in a given image-forming optical system, comprising steps of:
   providing a three-dimensional resolution chart comprising a block provided on an upper surface thereof, said block having an adjusting pattern depicted on a slant surface thereof;
   forming an image of said adjusting pattern of said three-dimensional resolution chart on a solid-state image detector through a master lens;
   calculating a contrast integration value based on the image of said adjusting pattern at each of a plurality of designated areas on said slant surface of said block provided on said resolution chart, and finding out a specific position where said contrast integration value becomes maximum, thereby identifying said specific position as focus point of said master lens;
   calculating an optimum position of said solid-state image detector in the given image-forming optical system, based on said focus point; and
   positioning said solid-state image detector to said optimum position by using a positioning mechanism.

2. A method for adjusting the position of a solid-state image detector in a given image-forming optical system, comprising steps of:
   providing a three-dimensional resolution chart comprising a plurality of blocks provided on an upper surface thereof, each block having an adjusting pattern depicted on a slant surface thereof;
   forming an image of each adjusting pattern of said three-dimensional resolution chart on a solid-state image detector through a master lens;
   calculating a contrast integration value based on the image of said adjusting pattern at each of a plurality of designated areas on said slant surface of each block provided on said- resolution chart, and finding out a specific position on each block where said contrast integration value becomes maximum, thereby identifying said specific position as focus point of said master lens;
   calculating an optimum gradient of said solid-state image detector in the given image-forming optical system, based on three-dimensional relationship between plural focus points of said master lens detected on said plural blocks; and
   adjusting an actual gradient of said solid-state image detector to said optimum gradient by using a positioning mechanism.

3. A method for adjusting the position of a solid-state image detector in a given image-forming optical system, comprising steps of:
   providing a three-dimensional resolution chart comprising a block provided on an upper surface thereof and a reference plane, said block having a first adjusting pattern depicted on a slant surface thereof and said reference plane having a second adjusting pattern depicted thereon;
   forming images of said first and second adjusting patterns of said three-dimensional resolution chart on a solid-state image detector through a master lens;
   calculating a contrast integration value based on the image of said first adjusting pattern at each of a plurality of designated areas on said slant surface of said block provided on said resolution chart, and finding out a specific position where said contrast integration value becomes maximum, thereby identifying said specific position as focus point of said master lens;
   obtaining a center-of-gravity position of said second adjusting pattern based on the image of said second adjusting pattern;
   calculating an optimum position of said solid-state image detector in the given image-forming optical system, based on said focus point and said center-of-gravity position; and
   positioning said solid-state image detector to said optimum position by using a positioning mechanism.

4. A method for adjusting the position of a solid-state image detector in a given image-forming optical system, comprising steps of:
   providing a three-dimensional resolution chart comprising a plurality of blocks provided on an upper surface thereof and a reference plane, each block having a first adjusting pattern depicted on a slant surface thereof and said reference plane having a second adjusting pattern depicted thereon so as to correspond to said first adjusting pattern;
   forming images of said first and second adjusting patterns of said three-dimensional resolution chart on a solid-state image detector through a master lens;
   calculating a contrast integration value based on the image of said first adjusting pattern at each of a plurality of designated areas on said slant surface of each block provided on said resolution chart, and finding out a specific position where said contrast integration value becomes maximum, thereby identifying said specific position as focus point of said master lens;
   obtaining a center-of-gravity position of said second adjusting pattern based on the image of said second adjusting pattern;
   calculating an optimum gradient of said solid-state image detector in the given image-forming optical system, based on three-dimensional relationship between plural focus points of said master lens detected on said plural blocks and said center-of-gravity position corresponding to each of said focus points; and
   adjusting an actual gradient of said solid-state image detector to said optimum gradient by using a positioning mechanism.

5. A method for adjusting the position of a solid-state image detector in a given image-forming optical system, comprising steps of:

providing a three-dimensional resolution chart comprising a block provided on an upper surface thereof, said block having an adjusting pattern depicted on a slant surface thereof;

forming an image of said adjusting pattern of said three-dimensional resolution chart on a solid-state image detector through a master lens;

calculating a contrast integration value based on the image of said adjusting pattern at each of a plurality of designated areas on said slant surface of said block provided on said resolution chart, and finding out a specific position where said contrast integration value becomes maximum, thereby identifying said specific position as focus point of said master lens;

displaying a composite image by superimposing said focus point on said image of said adjusting pattern; and positioning said solid-state image detector to a predetermined position based on said displayed composite image by using a positioning mechanism.

6. A method for adjusting the position of a solid-state image detector in a given image-forming optical system, comprising steps of:

providing a three-dimensional resolution chart comprising a plurality of blocks provided on an upper surface thereof, each block having an adjusting pattern depicted on a slant surface thereof;

forming an image of each adjusting pattern of said three-dimensional resolution chart on a solid-state image detector through a master lens;

calculating a contrast integration value based on the image of said adjusting pattern at each of a plurality of designated areas on said slant surface of each block provided on said resolution chart, and finding out a specific position where said contrast integration value becomes maximum, thereby identifying said specific position as focus point of said master lens on each of said plural blocks;

displaying a composite image by superimposing plural focus points on corresponding images of said plural adjusting patterns; and adjusting an actual gradient of said solid-state image detector to an optimum gradient based on said composite image by using a positioning mechanism.

7. The position adjusting method defined by any one of claims 1 to 6, wherein the adjusting pattern depicted on the slant surface of said block of said three-dimensional resolution chart is capable of correcting distortion aberration of said master lens.

8. The position adjusting method defined by any one of claims 1 to 6, wherein the adjusting pattern depicted on the slant surface of said block of said three-dimensional resolution chart is capable of correcting image magnification difference between slant surface elements on said block when said image magnification is differentiated at each of said slant surface elements due to difference of distance from said master lens.

9. The position adjusting method defined by any one of claims 1 to 6, wherein said resolution chart allows light to penetrate the body thereof, and a light source is disposed behind said resolution chart so as to allow light emitted from said light source to pass through the body of said resolution chart and being image formed on said solid-state image detector.

10. The position adjusting method defined by claim 9, wherein said resolution chart is incorporated into said master lens.

11. A method for adjusting the position of a solid-state image detector in a given image-forming optical system, comprising steps of:

providing a three-dimensional resolution chart comprising a plurality of blocks provided on an upper surface thereof, each block having an adjusting pattern depicted on a slant surface thereof;

forming an image of each adjusting pattern of said three-dimensional resolution chart on a solid-state image detector through a master lens;

calculating a contrast integration value based on the image of said adjusting pattern at each of a plurality of designated areas on said slant surface of each block provided on said resolution chart, and finding out a specific position on each block where said contrast integration value becomes maximum, thereby identifying said specific position as focus point of said master lens;

calculating an optimum gradient of said solid-state image detector in the given image-forming optical system, based on three-dimensional relationship between plural focus points of said master lens detected on said plural blocks; and adjusting an actual gradient of said solid-state image detector to said optimum gradient by using a positioning mechanism, wherein one of said plural blocks is capable of measuring a predetermined different or supplementary area in addition to an ordinary measuring area common to other blocks, thereby allowing a wide range of measurement of the focus point of the master lens.

* * * * *